(12) United States Patent
Ameri

(10) Patent No.: US 11,397,897 B2
(45) Date of Patent: Jul. 26, 2022

(54) KNOWLEDGE CURRENCY

(71) Applicant: Abbas Ameri, Pleasanton, CA (US)

(72) Inventor: Abbas Ameri, Pleasanton, CA (US)

( * ) Notice: Subject to any disclaimer, the term of this patent is extended or adjusted under 35 U.S.C. 154(b) by 541 days.

(21) Appl. No.: 16/566,857

(22) Filed: Sep. 10, 2019

(65) Prior Publication Data

US 2021/0073654 A1    Mar. 11, 2021

(51) Int. Cl.
  *G06N 5/02*     (2006.01)
  *G06F 16/28*    (2019.01)
  *G06F 16/9536*  (2019.01)
  *G06F 16/2457*  (2019.01)

(52) U.S. Cl.
  CPC ....... *G06N 5/022* (2013.01); *G06F 16/24578* (2019.01); *G06F 16/285* (2019.01); *G06F 16/288* (2019.01); *G06F 16/9536* (2019.01)

(58) Field of Classification Search
  CPC ..... G06N 5/022; G06F 16/285; G06F 16/288; G06F 16/24578; G06F 16/9536; G06F 40/00; G06F 16/9535; H04L 67/22
  USPC ............................................. 706/46; 707/722
  See application file for complete search history.

(56) References Cited

U.S. PATENT DOCUMENTS

| | | | |
|---|---|---|---|
| 7,797,736 B2 | 9/2010 | Blair | |
| 9,946,739 B2 | 4/2018 | Haddock | |
| 2014/0282219 A1* | 9/2014 | Haddock | G06F 16/22 715/781 |
| 2017/0068903 A1* | 3/2017 | Hakkani-Tur | G06N 20/00 |
| 2019/0235936 A1* | 8/2019 | Murdock | G06F 9/542 |
| 2020/0057946 A1* | 2/2020 | Singaraju | G06N 20/00 |
| 2022/0067115 A1* | 3/2022 | Zheng | G06N 3/0454 |

* cited by examiner

Primary Examiner — Evan Aspinwall

(57) ABSTRACT

An optimized, human-centered personalized search service where content is fully classified by community interests, experts by just in time learning, problem solving and digital assistants. This Knowledge Currency method has the capacity to acquire, organize, store, rank, and filter knowledge about facts and relationships. The knowledge refinery process is broken down into stages that can be parallel workflow leveraging a multi-step content topic extraction and refinery process for personalized searches with domain knowledge experts to connect collaboratively as well as knowledge reliability ranking score for element nodes on a knowledge graph.

5 Claims, 20 Drawing Sheets

Hybrid Human- Digital Knowledge Search Assistant scenario

Trusted & Qualified Digital Knowledge Refinery Life Cycle

FIG. 3
Compute Knowledge Currency Score (KCS) Valuation Example

| Weights \ Knowledge Feature quality rating data point | D Domain Classifier Model (taxonomy levels- level 1 = 10, with each depth multiply by 10) | I Industry Classifier Model (taxonomy levels- level 1 = 10, with each depth multiply by 10) | A Application Classifier Model (taxonomy levels- level 1 = 10, with each depth multiply by 10) | C Community Interests, Audience attentions Model (taxonomy levels- level 1 = 10, with each depth multiply by 10) | E Expert Curating Model (taxonomy levels- level 1 = 10, with each depth multiply by 10) | U Uncertainty- Unreliability factor Model (1: most reliable to 5 least reliable) | Compute KCS values Measure Knowledge usability from multi-dimensional perspective - currency Score (KCS) (values as a relative approximation data points) KCS = (D + I + A + C + E) / U |
|---|---|---|---|---|---|---|---|
| Content Analyzer (CA) sum(topics depth & breadth ) | 2430 | 1220 | 320 | 430 | 2320 | 2 | 6,720/2=3360 |
| Content Summarizer quality(CSQ) (1:Least to 5 most) X100 | 2 | 3 | 1 | 5 | 2 | 3 | (2+3+1+5+2)100/3=430 |
| Cognitive Curiosity Generator(CCG) (1:Least to 5 most)X100 | 5 | 3 | 4 | 1 | 2 | 2 | (5+3+4+1+2)100/2=750 |
| Conversational Agent Engagement (CAE) (1:Least to 5 most)X100 | 3 | 4 | 5 | 5 | 2 | 5 | (3+4+5+5+2)100/5=380 |
| Knowledge Currency Base model (KCBM) (1:Least to 5 most)X100 | 2 | 1 | 3 | 4 | 5 | 1 | (2+1+3+4+5)100/1=150 |
|  |  |  |  |  |  |  | KCS: Sum(kcs)=3360+430+750+380 +150= =5070 |

1400

1410 — Total KCS for An example Knowledge Nugget = 5070

Layered Architecture of Digital Knowledge Valuation Refinery

Contextual distinctions of Community, Expert & Customer Views

Universally Linked Domains using Shared Model Classifications

Multi-Stage Multi-Dimensional Knowledge Currency Valuation

FIG. 8

Example of Knowledge Currency Score (KCS) Valuation Algorithm

Example:

Knowledge object: K starts the Knowledge refinery process:

→ For every relevant topic at every depth level a score is assigned. Content Analyzer is a measure of depth and breadth of classification.

→ D = 3 topics (10) + 4 subtopics (100) + 2 deep topics(1000) = 2430
I = 2 topics (10) + 2 sub topics(100) + 1 deep topic (1000) = 1220
A = 2 topics (10) + 3 sub topics(100) = 320
C = 3 topics (10) + 4 sub topics(100) = 430
E = 2 topics (10) + 3 sub topics(100) + 2 deep topics (1000) = 2320

→ KCS Content Analyzer ranking score = 3,360, sorted from high value to lower value, filtering the specific "topics" extracted at each of the dimensions D, I, A, C, E.

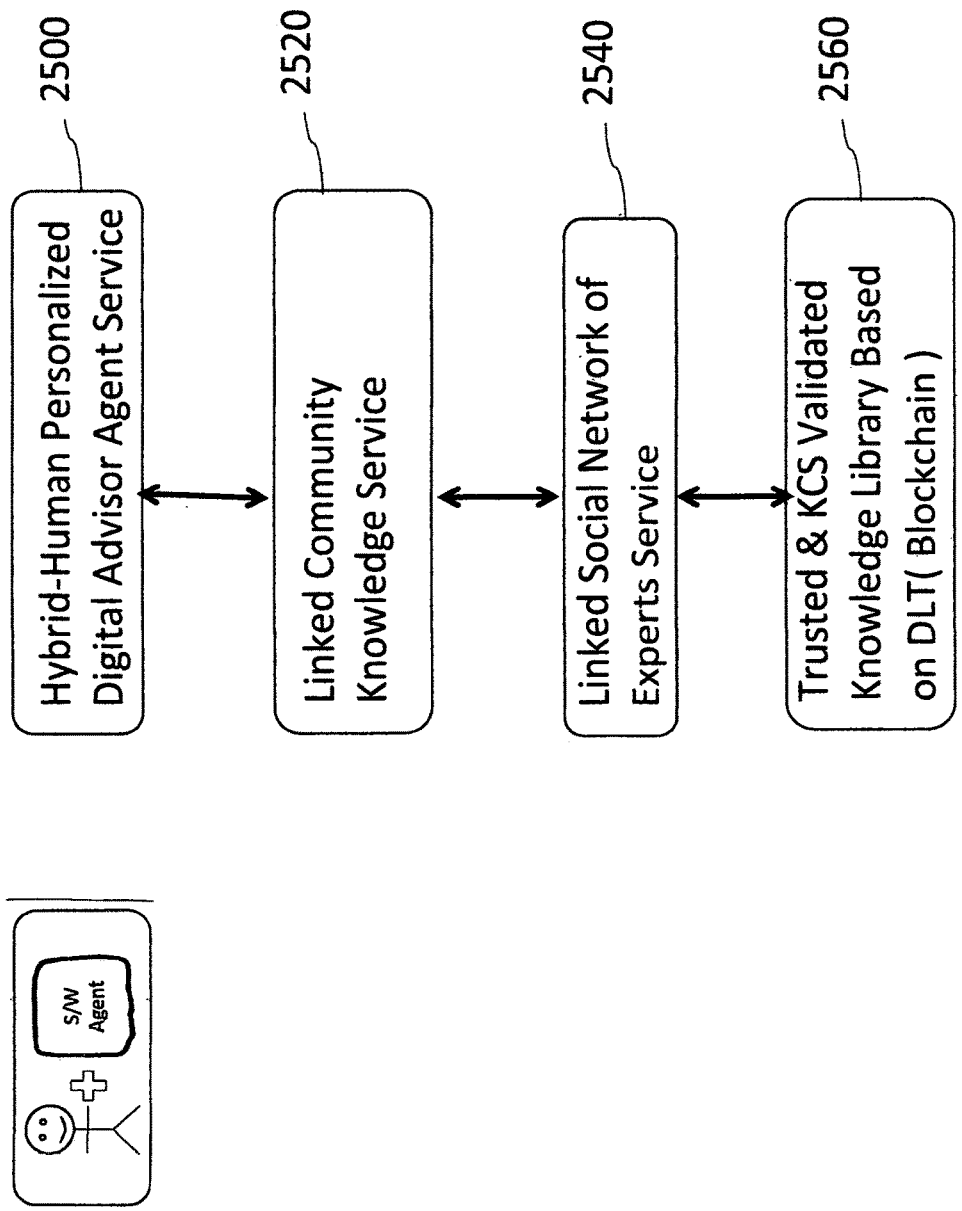

Community, Expert & Customer-Centric Knowledge Agents

Diverse Viewpoints Represented in Knowledge Graph Models

Community, Expert & Customer Viewpoints as Tag Classifications

Community & Expert Views in Adaptive Knowledge Classification

Example of Linking Community & Expert views via SKOS Model

FIG. 15
Example of Qualifying Knowledge with Specific Relationships

| Term (Relationship type) | Castles |
|---|---|
| Used For | Building or groups of buildings intended primarily to serve as a fortified residence of a prince or nobleman |
| Broader Terms | Fortification |
| Narrower Terms | Chatelets<br>Moated castles |
| Related Terms | Fortification elements |

Digital Knowledge Refinery and KCS Workflow Algorithm Steps 1-4

Digital Knowledge Refinery and KCS Workflow Algorithm Steps 5-7

Digital Knowledge Refinery and KCS Workflow Algorithm Steps 8-11

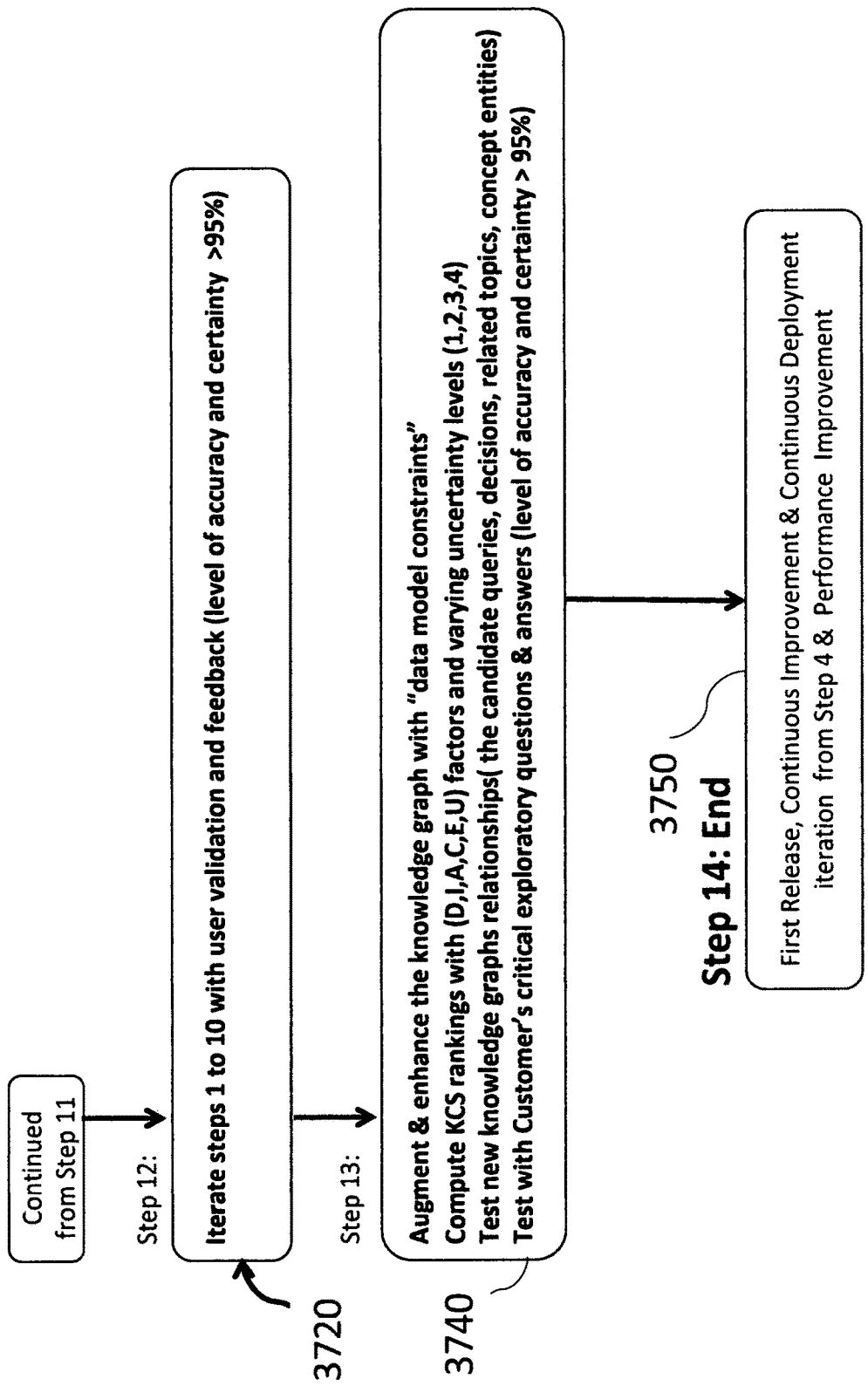

FIG. 20
Contextual & Conceptual Annotations of Knowledge Resources

```
type Topic {
  id: ID
  topic name: String
  parent topics: [Topic]
  subtopics: [Topic]
}
```

```
type Author {
  id: ID
  firstName: String
  lastName: String
  posts: [Post]
  expertise: [Topic]
}
```

```
type Query {
  post(id: IDI): Post
  author(id: IDI): Author
  ContextualTopics: [Topic]
  ConceptualTopics: [Topic]
}
```

```
type Post {
  id: ID
  title: String
  published: Date
  Domain: [Topic]
  Industry: [Topic]
  topics: [Topic]
  Creators: [Author]
  KnowledgeResource: String
  ContextualTopics: [Topic]
  ConceptualTopics: [Topic]
}
```

1

KNOWLEDGE CURRENCY

CROSS REFERENCE TO RELATED APPLICATIONS

This application claims the benefit of U.S. Provisional Patent Application No. 62/729,897 filed Sep. 11, 2018, entitled "Knowledge Currency", the disclosure of which is incorporated by reference herein in its entirety.

FIELD OF THE INVENTION

The disclosed embodiments relate generally to digital assistants, expert and community input and personalized, ranked and filtered search assistance to help users learn about and interact with things.

BACKGROUND AND SUMMARY

It has been noted that all human activities involve interacting with "entities," including those things real and imagined. FIG. 1 illustrates one of the most widely used methods of gathering information about entities is use of the internet (1), specifically, the World Wide Web.

The World Wide Web generally searches and produces results using key words. The Semantic Web (2) has addressed the inability of the World Wide Web search limitations by organizing and storing major kinds of knowledge (facts and relationships) about things (using "Resource Description Framework", or "RDF")), instead now looking for files of small pieces of knowledge about things with the attached knowledge (an "entity"). This has recently improved incorporating things into search results that may not have the specific matching word or phrase in a specific IP address or URL. The ability to tag an entity with a marker ("label"), classifying an entity, and linking it to other relevant entity markers is known and is seen in such examples as YouTube when it looks at what videos a user has viewed and suggests other such videos pursuant to a search. Such intersections of markers of a plurality of entities is sometimes called a "node" in the Semantic Graph (or, a "graph node") in a knowledge graph database. FIG. 11.

Now referring to FIG. 1. In the most basic type of search (1), the user (100) interfaces with the search software (150) through a computing device (200). In a more sophisticated scenario (2), a user is assisted with an Artificial Intelligence (AI) enabled digital assistant ("agent") (300), searching for information (350). For example, when we ask "Siri" or "Google home" to search for a music or a definition or news. Finally, in yet an even more complex scenario (3), a user is assisted by a digital assistant (400) looking for certain information or service interfacing (500) with another person using an AI enabled customer or business services (sometimes called a "hybrid human" because the entity is comprised of both AI and human (450) searching for the user).

However, each of these scenarios center around searching software (200 in scenario 1, 250 in scenario 2, and incorporated into 450 in scenario 3) that lacks the potential to acquire and apply knowledge about things searched, including the ability to make knowledge connections regarding similar things that can be reviewed by other users, scored and filtered with continued use (referencing FIG. 2, 600, below).

One aspect of the current invention is to help improve human conditions by making it safer & easier for people & autonomous agents to access reliable facts, discover new knowledge and relationships, identify patterns of better decision paths, generate personalized and adaptive digital conversations, as needed to simplify their complex work or life journeys as represented in a knowledge qualification cycle in FIG. 2 (discussed below).

In another aspect and example of the current invention, as seen in FIGS. 3 and 4, the method of enabling organizations organize, analyze (FIG. 3, 1410) and transfer their digitized knowledge and skills to their human FIG. 4 (1500) or/and their digital assistance clients (machine) and other sophisticated interfaces like voice-enabled digital assistant (1510). This includes the ability to organize and analyze information in electronic form (1600).

In still another aspect and example, and now referring to FIG. 2 in greater detail, the method presents an integrated system of multi-stage classification process flow method, from (raw content (700) to refined personalized knowledge) (1300), leading to an efficient and trusted multi-dimensional human-centered quality knowledge search, discovery & recommendation service (1420) (referencing FIG. 4, below).

In another aspect and example, and again referring to FIG. 4, the Knowledge Currency method (1670) helps organizations be prepared for offering their knowledge, expert services and customer care in all three scenarios listed in FIG. 1.

Other smart searches are known, such as those by Haddock, Robert (U.S. Pat. No. 9,946,739B2) or Blair, Tim W., et al. (U.S. Pat. No. 7,797,336B2) with knowledge graphing based in on the Semantic Web mentioned above. The present invention prioritizes the needs of the consumer (see FIG. 2, (1200) in transferring, classifying and disseminating digitized knowledge versus the content producers or ad sponsor's target marketing.

This method strives to produce highly relevant, consistent, reliable and personalized knowledge in response to search, discovery and recommendation service (1420) quests by systematically and iteratively incorporating knowledge tags (1610) found in the Semantic Web applications in parallel with community (1570) (all referenced in FIG. 4), expert and consumer's feedback and continued use renewing tags and scoring reliability (1300) (referenced in FIG. 2) of the tags for continued accuracy and a personalized search service (2210) (referenced in FIG. 5).

BRIEF DESCRIPTION OF DRAWINGS

FIG. 3 Compute Knowledge Currency Score (KCS) Valuation Example shows an example of the Knowledge Currency Score tabulation.

FIG. 8 Example of Knowledge Currency Score (KCS) Valuation model shows an example of working through scoring currency of a knowledge object using various auto classification techniques.

FIG. 9 Adaptive Knowledge Model-Driven Digital Advisory Method shows 4 abstract layers of knowledge sourcing, KCS valuation and delivery to clients that can be implemented and provisioned in a non-monolithic, scalable, trusted and distributed computing architecture. The result is an adaptive AI-enabled, explainable, traceable and trusted flow of current knowledge objects (knowledge nuggets) from distributed sources of knowledge to consumers of knowledge in personalized client advisory applications.

FIG. 15 Example of Qualifying Knowledge with Specific Relationships shows an example of representing knowledge about "Castle" as a type of building at a more specific depth and breadth.

FIG. 19 Digital Knowledge Refinery and KCS Workflow Algorithm Steps 11-14 shows high level logical process and functional tasks at each steps of 11, 12, 13 and 14. Assign KC token as an incentive to all experts, and community members who participate in content curation, testing and provides accuracy feedback.

FIG. 20 Contextual & Conceptual Annotation of Knowledge Resources shows an example of queries that can be used interfacing with the knowledge graph. It represent annotation of a knowledge resource with various perspectives and levels of topics.

DETAILED DESCRIPTION OF PREFERRED EMBODIMENTS OF THE INVENTION

Figure 1:
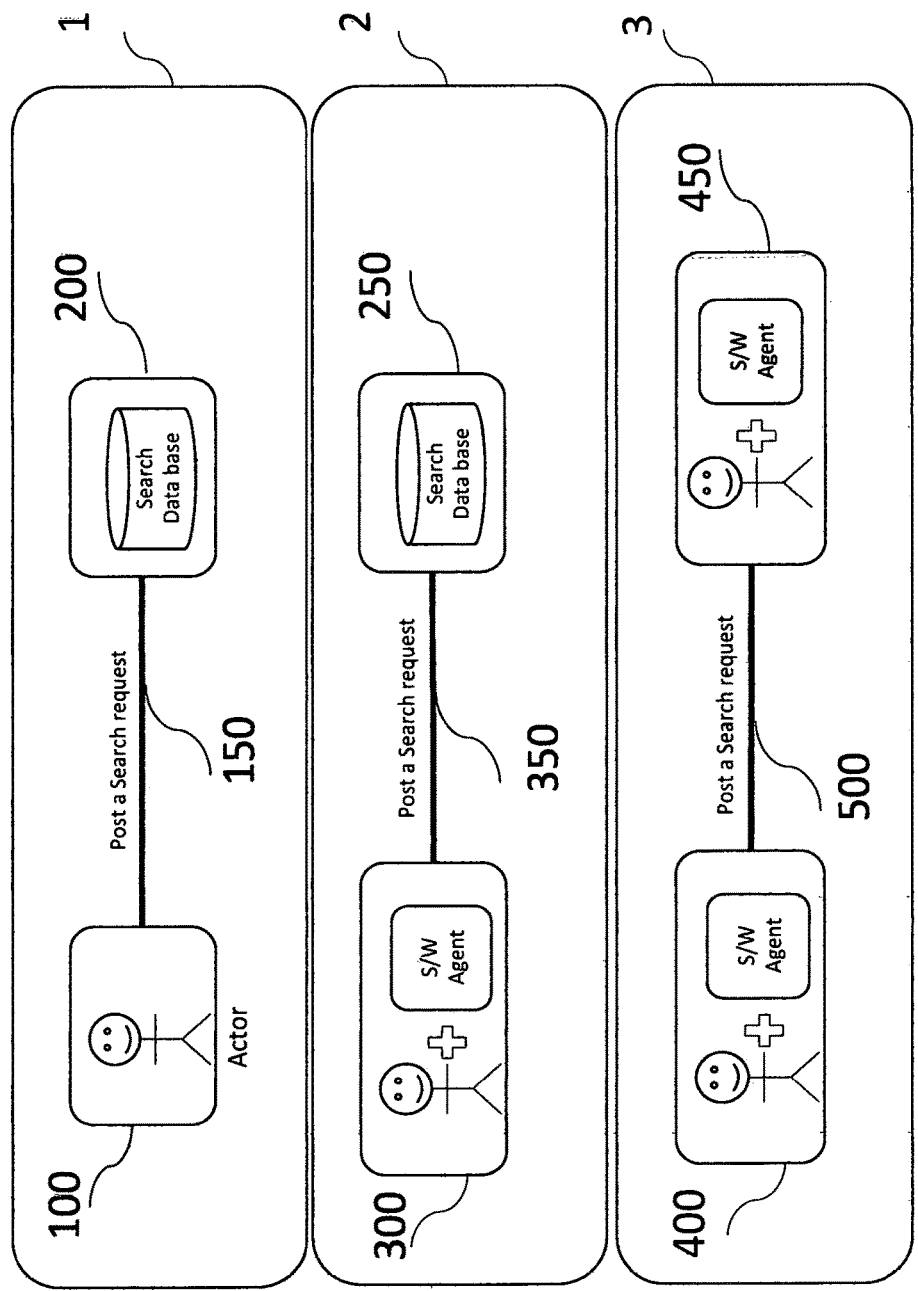
FIG. 1 Digital Knowledge Search Assistant scenario shows three known scenarios of digital search between humans and digital assistants.

NOW LOOKING AT FIG. 1, which includes the three sub-figures (1), (2), (3), 4 illustrates the three human and agent knowledge-based search request, advisory and conversation scenarios. Specifically, sub-figure (1)—a traditional on line web site search scenario, a human (100) is interfacing with the software (150). Sub-figure (2)—a more sophisticated scenario, where a human is assisted with an Artificial Intelligence (AI) enabled digital assistant ("agent") (300), searching for information (350). For example, when we ask "Siri" or "Google home" to search for a music or a definition or news. Sub-figure (3)—a more complex scenario, where a human, assisted with a digital assistant (400) looking for certain specific information (500) or service interfacing with a hybrid human and AI enabled customer or business services (450). An example use case: Digital Assistant agent, autonomously engaging consumer (actors), in communication with their clinician, accessing services and resources they can benefit from by searching through trusted Medical Knowledge Library resources that are beneficial to consumer (Actor) and specifically organized using expert reviews (1200), community usage (1100) and personalized ranking (1000).

The current method of website publishing, search and knowledge discovery are generally made for human visitors and requesters from the perspective of industry producers and benefits of brand advertisers and not consumers (actors). They can only meet the needs of (1) scenario and some of the (2) scenarios. Hence there is a gap.

The human guided (400) feedback increases dynamic diversity of possibilities in the classification models which reduces the noise (returning too many low relevancy search results) and increases the discovery of meaningful relationships between the content objects, identified entities, search queries, and recommendation options (500).

The increased relationship discovery (450) (through in-depth analyzing the content (600) and incorporating community (1100) and domain experts' feedback (1200)) of relevant cognitive relationship classification, lowers the chance for bias and unreliability, from the perspective of the customer's community and experts, during search ranking computation, indexing that influences the search and recommendation outcome.

Figure 4:
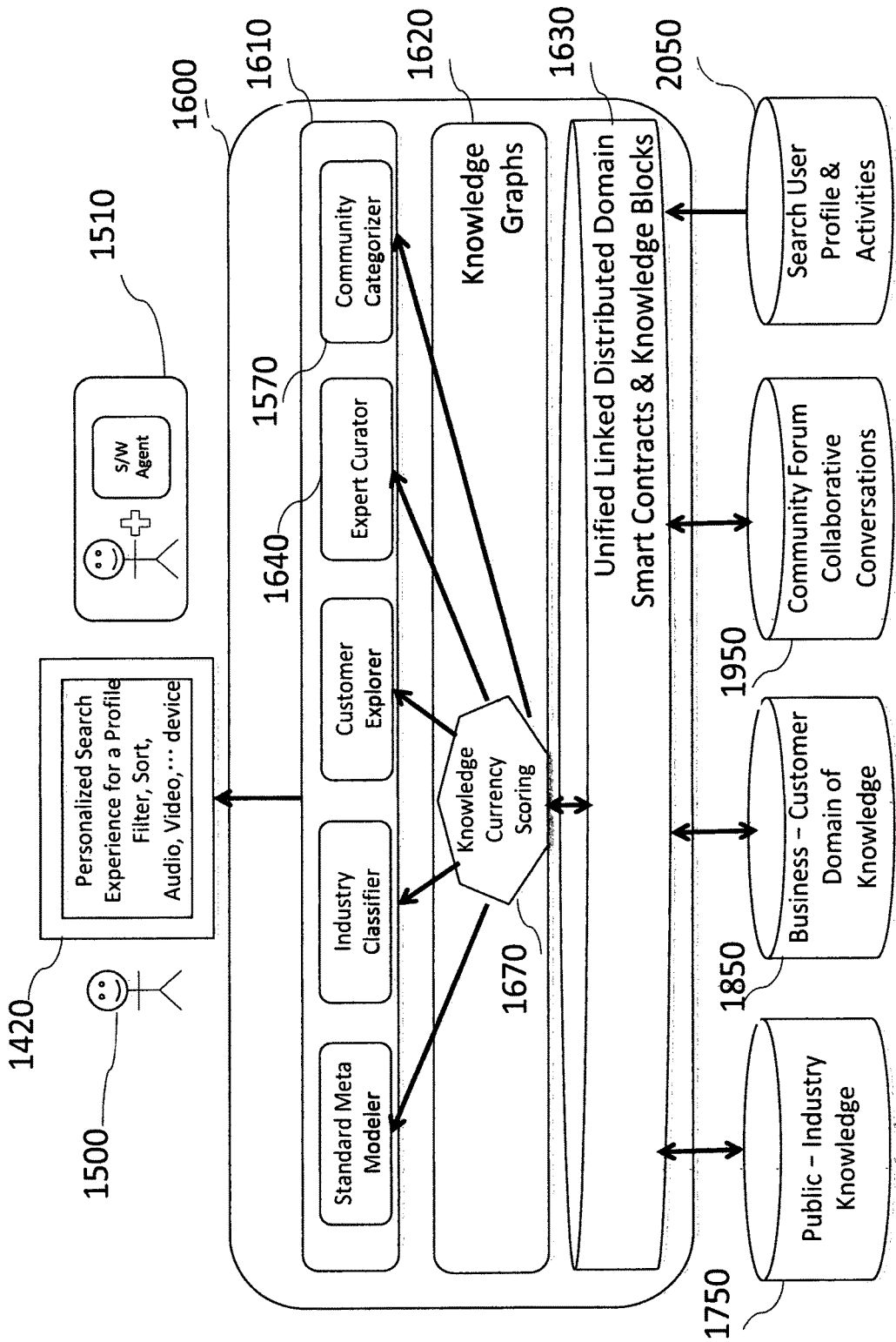
FIG. 4 Layered Architecture of Digital Knowledge Refinery Valuation shows layered architecture of distributed trusted digitized knowledge transfer (between human (users) and model-driven smart contracted agent).

An embodiment allows users (400) to select an entity by entering a search request in a user interface and interacting with agents (450). As illustrated in FIG. 4, the user begins entering a search request, methods activate an agent (1510) that starts analyzing the search request and initiates direct bi-directional communications with a "knowledge graph," a networked database having encoded, sharable knowledge about entities (1620). If the agent determines that the knowledge graph contains more than one entity meeting the user search request parameters, it opens a visual panel in the user interface of the user computer used to conduct the search (1420) and displays a list of such possible entities, along with knowledge about them, including: the names of the entities, and for each of the named entities additional knowledge about the entity, including its "entity group," for example "Person," denoting a broad category for the possibly matching entity; its "entity type," for example, "Actor," denoting a more narrow category for the possibly matching entity; and "knowledge labels", specific properties that, when viewed by the user, can help the user select a specific entity of interest, as illustrated in example in FIG. 14 (3100). Enabled to see such specific knowledge about each possible entity meeting their search request, users (1500) can disambiguate among them and select their specific entity of interest by touching it or clicking on it or speaking its name. Users that are recognized experts in the specific labeled knowledge "knowledge nuggets" may add labels of opinion and assessment of the subject matter, current and over time aggregated expert opinion, feedback and perspective regarding specific content, representing knowledge nugget labels in terms of usage, usefulness, with additional annotation, comments, side notes or tags (1610).

In an embodiment, "metadata" is stored in a database such as My SQL in data structures that insure its consistency and integrity. The metadata includes lists and tables helpful to or necessary for categorizing and managing knowledge and "smart content" (1630).

In an embodiment, and again referring to FIG. 2, methods pre-process a variety of content resources (700) wherein said methods transform such content resources into "smart content" (600), i.e., coherent rationalized content that contains embedded knowledge about itself in a specific component of each smart content record.

Figure 2:
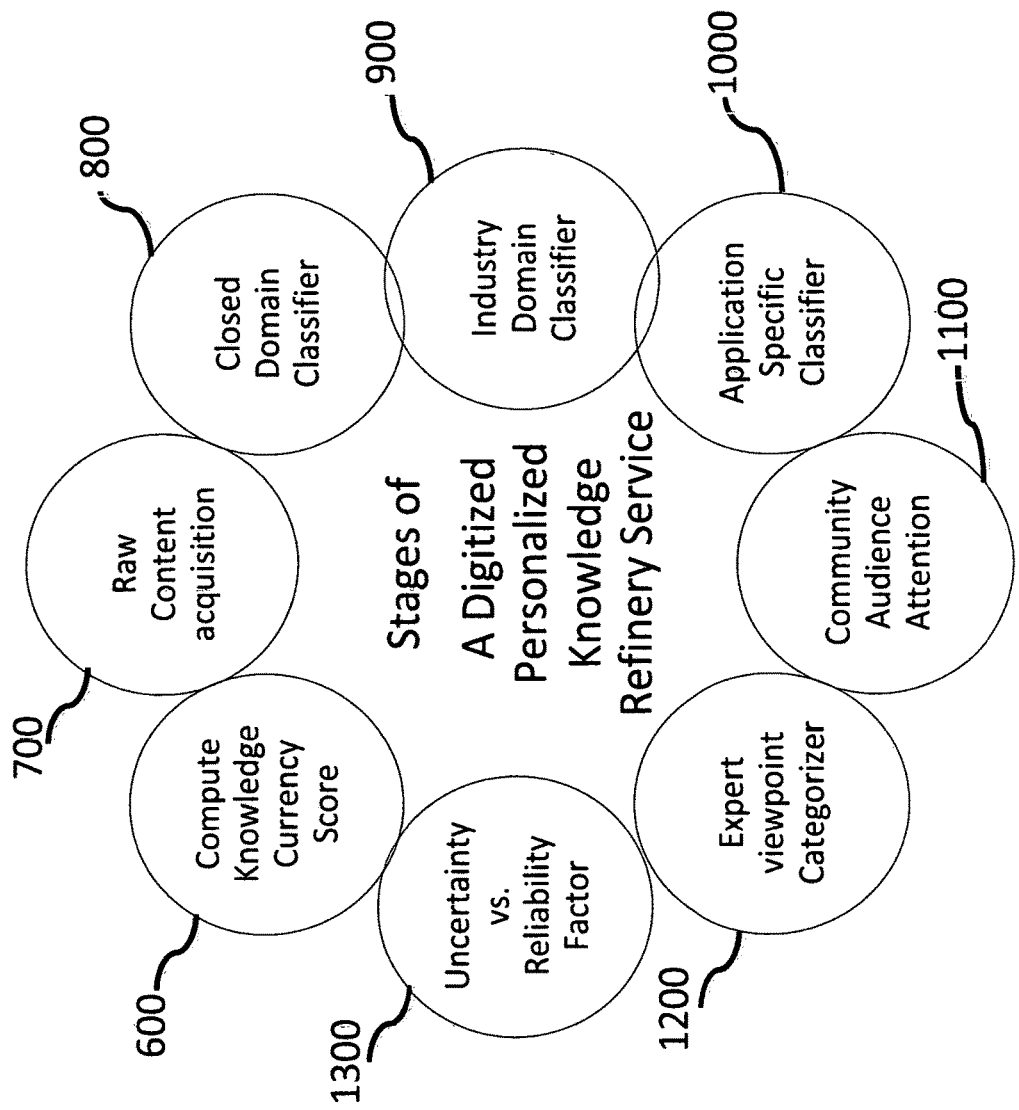
FIG. 2 Trusted & Qualified Digital Knowledge Refinery Life Cycle shows a diagram illustrating Customer's benefit centric knowledge processing cycle, using Knowledge Currency Score model, and Multi-Stage Multi-Dimensional knowledge refinery service model.

FURTHER LOOKING AT FIG. 2, the Customer's universe of knowledge needs, digitized in terms of fine grain topic annotated digital library expert system, that uses the multi-dimensional Knowledge Currency Score ("KCS") (600) elements, during indexing, searchable knowledgebase (well defined set of database of topics & labeled content structures), trained AI modules capable of content vision analytics, NLP (Natural Language Processing), ML (Machine Learning) and semantic knowledge graph database management services all enabling auto tag extraction, recommended tagging and content classification. Knowledge Refinery repository (semantic knowledge graph) that plays a central role in continuously assisting in learning, collaborating, disseminating knowledge nuggets, via connecting and strengthening the accuracy of topics and strengths of relationship bonds between topics (how tightly topics are related).

The conceptual life cycle diagram in FIG. 2 illustrates the streamline integration and interoperation of various stages of deep content processing and reuse as part of the KCS method (600) of knowledge refinery process cycle, designed to uniquely identify, connect, track, measure, increase relationships between an organization's foundational product (1000) or service knowledge sets through online and parallel collaboration of actors (1100) with tasks required for automatic classification or/and human-guided annotation and search as a data service (1200).

Specifically, Knowledge Currency Score (KCS) (600)—represents the invention method, implemented in terms processes involved in computing the relative contextual value ranking of a content when deciding on search query selection, filtering and sorting units of consumable knowledge (digitized metadata labeled content piece, for example a message, paragraph, article, lesson objective, response to a question, or digital media clip).

The "Raw Content Acquisition" is the first stage (stage one), (700) and represents processes involved in retrieving the raw content from documents in specific public or private repository ("knowledge database").

"Closed Domain Classifier" (FIG. 3, Column D for reference) is the second stage (stage one), (800) represents extracting, identifying, and adding to the growing dictionary of domain vocabulary topics (meaningful and clear concepts generally recognized as uniquely understandable and useful concepts) and associating them (labeling) to the specific content piece in the raw content data set. For example, a content piece can be a paragraph in legal document or a small text segments in a lecture, article or message, a forum or social media post, the paragraph, diagram, photo, small multimedia digital audio or video clip. Once the specific content piece is further labeled with specific relevant topics it is a less ambiguous and segment ("entity" or "knowledge nugget") very relevant to this domain of knowledge—known or derived concepts, (unambiguous subjects labeled as entities). This can be topics-and multiple levels of sub-topics, adding them to customer's growing knowledge graph meta database ("knowledge refinery"). The more fine grain labels the higher the degree of classification and better relevancy outcome.

The "Industry Specific Classifier" (FIG. 3, Column I for reference) is the third stage (900) and represents extracting, identifying, and adding to the growing dictionary of industry relevant vocabulary topics and associating them (industry specific classifier labeling) to the specific content piece that is now one level classified with domain vocabulary in the second stage (800) as additional metadata that now recognized as a knowledge nugget. This can be topics-and multiple levels of sub-topics, adding them to customer's growing knowledge refinery. The more fine grain the level of topic and sub-topic, the higher the degree of classification and better relevancy outcome.

The "Application Specific Classifier" (FIG. 3, Column A for reference) is the fourth stage (1000) and represents extracting, identifying, and adding to the growing dictionary of customer's internal operation, processes and application relevant vocabulary topics and associating them (labeling) to the specific content piece that is now one level classified with domain and industry vocabulary in stage 2 (800) and stage 3 (900) as additional metadata that further defined and enriched knowledge nugget. This can be topics-and multiple levels of sub-topics, adding them to customer's growing knowledge refinery. Again, the more fine grain the higher the degree of classification and better relevancy outcome.

The "Community Audience Attention" level (FIG. 3, Column C for reference) is the fifth stage (1100) and represents capturing the community's current and over time aggregated community voice, feedback and perspective regarding specific content, representing them in terms of usage, usefulness, with additional annotation, comments, side notes or tags. This is can be part of a manual or fully automated sentiment analysis a process of clustering, normalizing, standardizing those tags and adding them to customer's growing knowledge refinery, the growing dictionary. Yet again, the more fine grain, the higher the degree of classification and better relevancy outcome.

The "Expert viewpoint categorize?" (FIG. 3, Column E for reference) is the sixth stage (1200) and represents capturing the opinion and assessment of the subject matter expert human participants, current and over time aggregated expert opinion, feedback and perspective regarding specific content, representing them in terms of usage, usefulness, with additional annotation, comments, side notes or tags.

The Uncertainty & Unreliability score (FIG. 3, Column U for reference) is the seventh stage (1300) and is a numerical value, that represents the measure of lack of confidence in classification of the unit of knowledge. The lower the number, and levels of, topics/sub topics related, the lower is the strengths of classification bonding (as computed in K, by customer's semantic knowledge network link analysis).

NOW LOOKING AT FIG. 3, and in more detail, the following matrix describes the example values and computational relationships between 7 items in KCS knowledge segment ranking model. It is designed to be extensible and adaptive (1410) given the level of complexity of the knowledge domain or depth of search relevancy needed. It can be calculated on going as new raw content is processed and ingested through the 7 stages of life cycle of FIG. 2.

With every new raw content ingestion (7 stages of content analytics, classification and KCS value scoring) and search activity using the growing knowledge refinery (illustrated in FIG. 2) database of customer's core elements, Knowledge Currency Score changes and dynamically represents the digitized collective intelligence and reasoning of customer's expert and voice of its community, which enhances its relevancy for each search result consumer, the deeper the topic and subtopic associated, the higher the score.

The multi-dimensional (7 stage dimensions) in computing KCS, is needed during ranking of Personalized Human-Centered Knowledge Search results (600). In this model, search user profile and entitlement is not included since that is a given fact and applicable at any time after the core search results are ranked.

The following KCS algorithm is illustrated with one iteration (1400) how the context of customer's domain and their community and experts' perspectives are considered in ranking, selection and relevancy of the search results. The high-level conceptual description of KCS scoring algorithm calculation specification is demonstrated below. For every unit of knowledge (knowledge nugget) in the method illustrated in (700), the Knowledge Refinery, we identify the associated topic types and relationships with classified topics (through stages): $KCS=(D+I+A+C+E)/U$.

As an example of a knowledge object (2400) in this FIG. 8, we reference the model of FIG. 3, which starts the Knowledge Refinery process:

For every relevant topic at every depth level a score is assigned.

$D$=topic 3(10)+sub topic 4(100)+deep topic 2(1000)
=2430

$I$=topic 2(10)+sub topic 2(100)+deep topic (1000)
=1220

$A$=topic 2(10)+sub topic 3(100)=320

$C$=topic 3(10)+sub topic 4(100)=430

$E$=topic 2(10)+sub topic 3(100)+deep topic 2(1000)
=2320

$KCS=Sum(D,I,A,C,E)/U$, where $U=2$ in this example $KCS=3,360$ ranking score—sorting can be arranged from high to low, filtering the specific "topics" extracted at each of the dimensions D, I, A,C,E (FIG. 3, 1410).

The strategic goal is to measure and increase the value created (1410), through this end-to-end automated, secure and fine grain close domain knowledge refinery process, create optimization by increasing reuse and augmenting prior classification, recognize and reward the participants through value-based scoring algorithm (KCS) (1400). As illustrated in the example (FIG. 3), each data point is a relative measure of quality, depth and breadth of topic classification. Total KCS for the knowledge nugget K, (KNi) is 5070 (1410).

Figure 10:
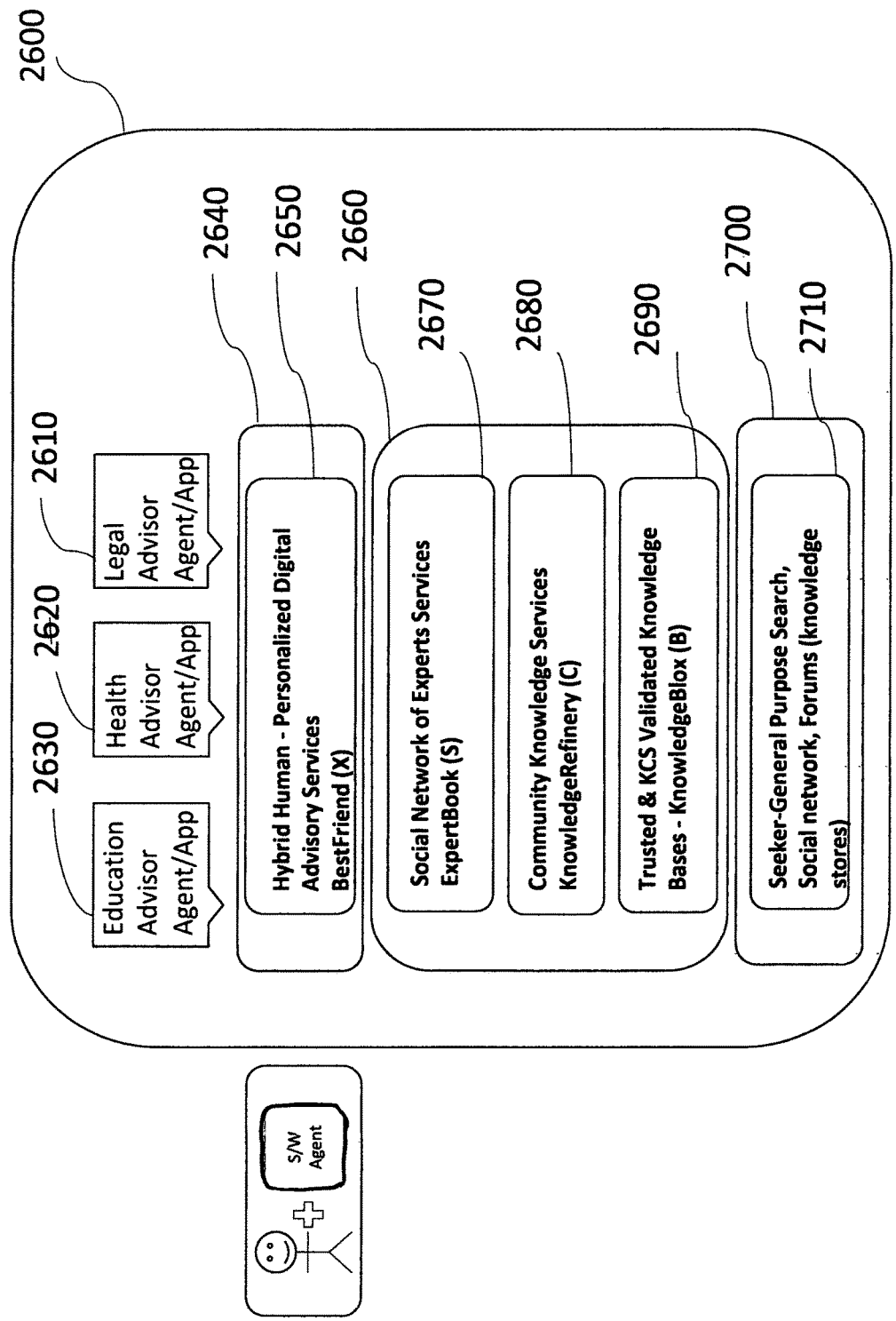
FIG. 10 Community. Expert & Customer-Centric Knowledge Agents shows how various diverse perspectives can be incorporated and incentivized to collaborate in a knowledge refinery classification workflow. This is extremely important in delivering customer benefits-centric knowledge services that are automated, with adaptive rule based reasoning and personalized digital advisory agents in various knowledge-intensive industries such as education, healthcare, legal and business application domains.
Figure 11:
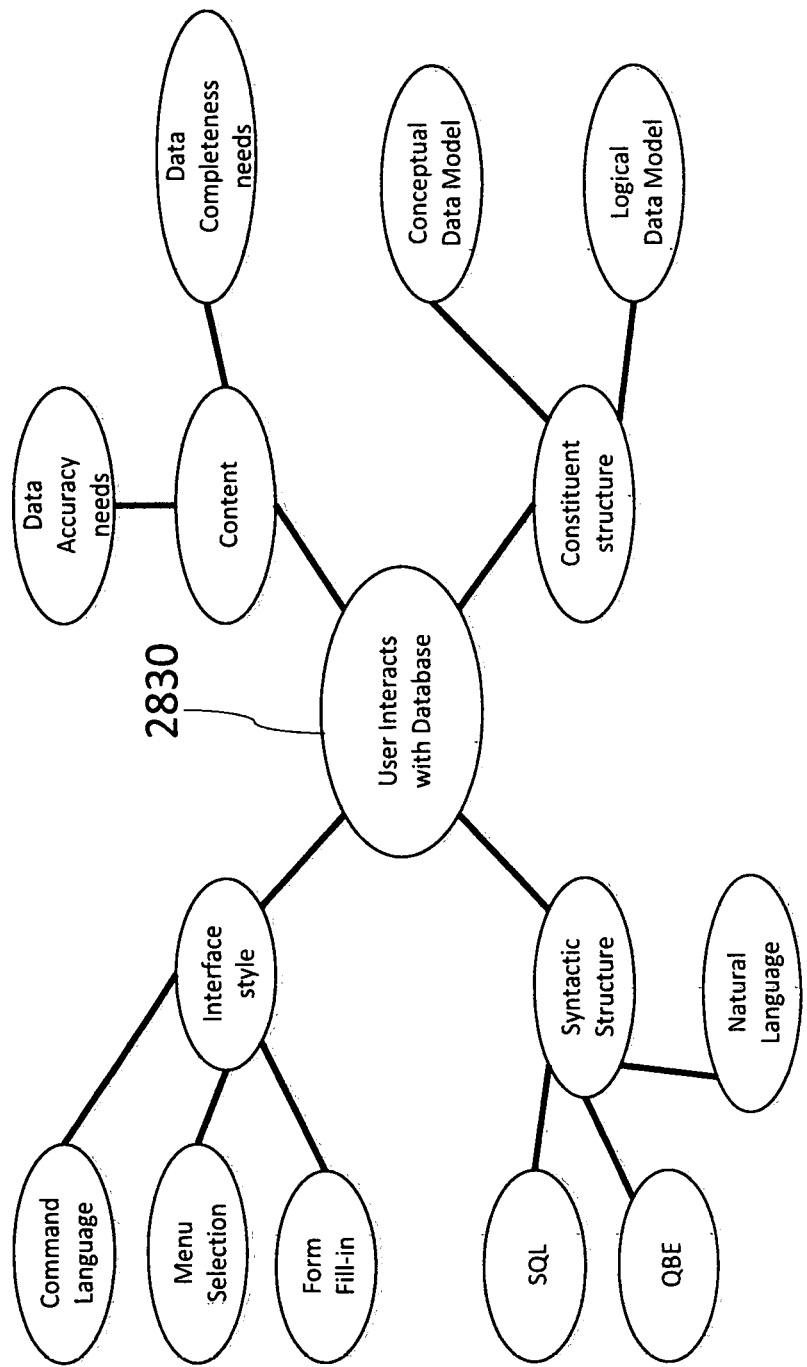
FIG. 11 Diverse Viewpoints Represented in Knowledge Graph Models shows an example of an ontology model of a user's (for instance a member of database community or expert) specific viewpoint at a point in time, regarding "data base skills" represented in terms of classifying and relating database knowledge topics, skills and abilities.

NOW REFERRING TO FIG. 10, the diagram illustrates how a business, by transforming their original isolated and disconnected knowledge sets, into well classified knowledge models scale their business operation (managing the costs, constraints and goals), and increase personalized service and gained value to their clients.

An example use case application of KCS (see FIG. 4 and FIG. 10) that was designed and implemented is optimizing by saving time, a specific subset of legal document type (1850) processing, from content search, analysis (2610), specific concepts recognized ("Seeker") (2640), extracted and summarization as part of their back office operation of a business, like law firms, ("ExpertBook") (2670), such that their document processing and customer interactions can be digitally organized ("KnowledgeBlox") (2690), and augmented with additional capacity and knowledge skills of Digital assistant staffs ("BestFriend") (2650).

In general other content-intensive professional service organizations like educational institutions (2630), Legal firms (2610), CPA firms or Health care organizations (2620), who are faced with ever growing client demands from their limited supply of staff, domain experts and customer support centers, as part of their routine operation produce and consume content within their domain to offer their high value expertise and knowledge services to their clients. A frequently recurring and major portion of their time spent at work includes many occasion of disjointed content gathering, natural language reading, understanding and analysis, finding associating new possible connections and correlations between various pieces of content, summarizing, communicating and responding to requests (2700).

The challenge for these organizations as they continue to grow will continue to be scalability and quality of service experience—how to engage their client's needs, and continue to meet the growing demand for their limited time and attention and professional knowledge, through in-depth digital transformation: delivering, the right knowledge nuggets, expertise, recommendation, answers to questions to the client's end-point as a service (2600).

One aspect of an embodiment functions to simplify and increase the value depth of the data classification quality, opportunities for reuse and exponentially grow the value added to the domain specific knowledge via iterative refinement and discovery of new meaningful relationships (FIG. 4, 1670).

The deeper the core concepts are recognized (FIG. 3, 1400), extracted, associated with and searched from each content, the higher the KC value based ranking score which represents its utility and relevancy to its clients (FIG. 4, 1510).

Through digitizing document types into specific data elements, uniquely identified with a universal ID that is also a formalized, machine readable knowledge representation and metadata models, content classification can scale through workflow automation, model-driven Artificial Intelligence/natural language processing ("AI/NLP") and machine learning, and utilizing the specific domain's core vocabularies and human guided feedback. (1610)

The cognitive contribution of their client's (user's) communities (1570), industry experts are registered values and secured via smart contracts (1630), simplifies the flow of the digitized knowledge-transfer, scalable operation, growing digitized knowledge capital while providing personalized digital service to their clients (1420).

The in-depth content structuring, enriching, refining, interlinking and annotating of target content to the extent it meets the search query criteria results in a much more practical and smaller highly classified, categorized, relevant, purposeful and personalized search results (1630).

In depth analysis of target content is primarily based on quantifying trustworthiness and unreliability risk of content pieces given the realities from human consumer perspective (FIG. 3, 1300). In this model, the Multi-Factor Relevancy is measured based on what community and domain experts and consumers value, given their attention and experience rather than brand advertisers target marketing criteria.

The simple online digital Search scenario between human and generalized Search services are continuing to get more complicated and complex with the inclusion of AI Digital assistant agents issuing the digital search and exploration requests, where content search service occurs between humans and digital agents, in human natural language, where there are not many explicit indicators to narrow down the search results as part of the search query.

One embodiment is focused on using data analytics and advance AI to quantify the quality of target content using a novel multi-dimensional scoring mechanism, called ("Knowledge Currency") that has a minimum of 6 core dimensions that captures core viewpoints representing one's general target domain of knowledge, topics of interests, community and personal viewpoints, by refining and constraining flow of expert knowledge, and filtering out irrelevant and noisy information through:

enhancing personalized online search filters,
interactive engagement, and
discovery of knowledge and tools
needed for continuous learning, and
application of reliable personalized know-hows "KnowledgeBlox", (FIG. 10, 2690)

to model critical problems, and best resolution paths while detecting unfair bias, enhancing relevant decisions by automatically utilizing a smart reasoning engine, "Seeker" (2710), that applies their community's insightful perspective & domain expertise, "ExpertBook", (2670) using advance scoring techniques to calibrate the qualities of supplied knowledge as needed in Conversational AI digital care, mentor and advisory applications, "BestFriend". (2650)

NOW CONTINUE LOOKING AT FIG. 4, the diagram illustrates the abstract function of each data system, how a business (1850), by transforming their original isolated data (1750) and disconnected knowledge sets (1950), into well classified knowledge models (1620) that can scale their business operation (managing the costs, constraints and goals), and increase personalized service and gained value to their clients (1420).

As on line information suppliers grow exponentially, with wide range of content quality rapidly increasing, it is becoming much more complex to discern between reliable information and trusted expert knowledge products & services (1610).

The problem is exponentially aggregated when search engines and digital assistant interfaces are served with biased, overly commercialized and unreliable content.

Accessing the right expert validated information (1640) and services for the right situation that observes a person's needs and community values (1950), is becoming more difficult, costly, time consuming and noisy with occasional "fake news" (a portion of which may comprise 1750).

The 5 layered method and system architecture are designed into an integrated knowledge discovery (1620) and model-driven automatic classification system (1610) that allows for transparent quality valuation (1670). The content analytics workflow process enables the enhanced human-centered digital search (1420) & natural interaction experience (1510).

The core problem of "unclassified content" with few or no associated metadata is addressed by applying an iterations of parameterized and dynamic knowledge analytics and governance models, contextually annotating and populating the personalized and virtualized knowledge graph database.

The result is a set of Computer services (API, or Application Program Interfaces that facilitate the digital knowledge transfer through a computational method called "Knowledge Currency & Reliability Value based model" ("Knowledge Currency Scoring"), with the objective of ultimately benefitting people, their communities (1950) and organizational entities given the domain and industry expert perspectives, interested in optimizing & evolving their online search experience (2050) and decision path planning over time.

The Knowledge Currency Scoring ("KCS") model (1670), allows the computation of an enhanced formula as a framework of variable and invariant factors that are used for implementing personalized digital search & knowledge discovery algorithms as a core service for high performing digital engagement & expert advisory services (1620).

This framework is made of content analytics templates (metamodels), database schemas and software modules:

1- interactive, adaptive and configurable domain knowledge classification,
2- recursive annotation selection processes,
3- through network of curated knowledge assets, and
4- tools facilitating constructive and intelligent digital conversation among agents (human or/and computing autonomous agents with multi variant perspectives) (1510).

This enhanced digital knowledge exploration method changes the way computers process raw content into a refined well annotated knowledge base that can be indexed and search with relevant highly connected topics resulting search engine optimization plans, reflecting core topics and relationships in a specific knowledge domain, reflecting needs and languages of members of target communities. The dynamic model driving search engine optimization factors are:

1- consumer-centered optimized prioritization parameters
2- continuously adaptive evidence-based exploration scoring mechanism
3- expert argumentation pathways
4- human curated knowledge to rank relevancy of digital search experience.

As illustrated in FIG. 4, and as one embodiment, the subset of legal document types has used the seed metadata model (knowledge models) and trained machine learning classification module ("Seeker") (1610) to automate the content retrieval (from a public repository of legal documents), conduct AI enabled format conversion (OCR and PDF document types), facilitating in depth relevant concept extraction, analysis, fine grain data element recognition, data classification, content labeling and finding summarization of a set of document types that helps infer new reliable relationships, discover inconsistencies, hard to find anomalies, saves time and effort of manual labor of 1 staff over 10 minutes to 100's of such documents in 10 minutes plus updating the outcome in an highly organized semantic knowledge graph database (1620) ("Knowledge Refinery"). This automation has demonstrated its optimization and usability impact during a special knowledge domain search experience, which is a significant business operation optimization.

Figure 5:
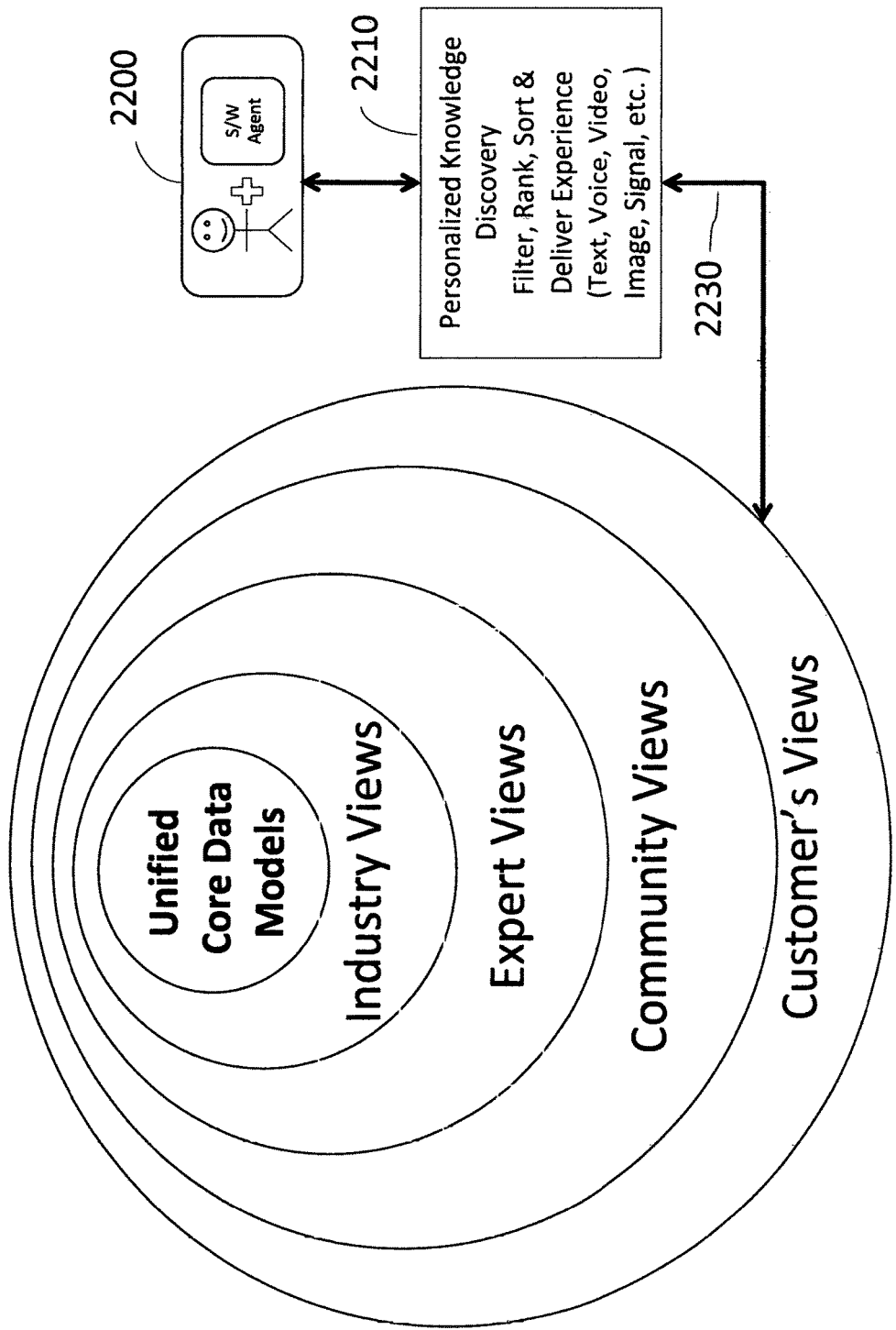
FIG. 5 Contextual Distinctions of Community, Expert & Customer Views shows an example of a knowledge graphing strategy describing various contextual views of concepts and aspects that are considered beneficial, useful and personalized for a user-database interaction.

NOW LOOKING AT FIG. 5, the online digital knowledge search assistant scenario between human (2200) and generalized Semantic Search services (2210) are continuing to get more complicated and complex with the inclusion of M Digital assistant agents issuing the digital search and exploration requests, (2230) where content search service occurs between humans and digital agents, in human natural language, where there are not many explicit indicators to narrow down the search results as part of the search query.

The differentiation of this multi-stage and multi-dimensional model for classifying and refining knowledge blocks from uncertain elements is in its flexibility and dynamic adaptation and leveraging prior iteration of digitized knowledge in each future content upgrade cycles.

FIG. 5 illustrates how various knowledge models are represented, aligned, implemented and deployed as formal ontologies and interlinked into semantic knowledge graphs populated with Customer's domain, industry and application specific facts, (Subject, objects and predicates) and business rules, extensible and actionable through reasoning functions.

FIG. 5 illustrates this is but one example of a knowledge graph describing various concepts and aspects of a user's database interaction (2200). The use of well-structured domain knowledge graphs provides the seed knowledge models that can be reused, augmented and simplify the continuous knowledge transfer (between humans and machine) (2230), Natural Language processing, Understanding and generation through various Machine Learning based content classification. The problem of how we classify and train the initial sample training content set is generally referred to as "Day 0" or "cold start problem in AI".

Figure 6:
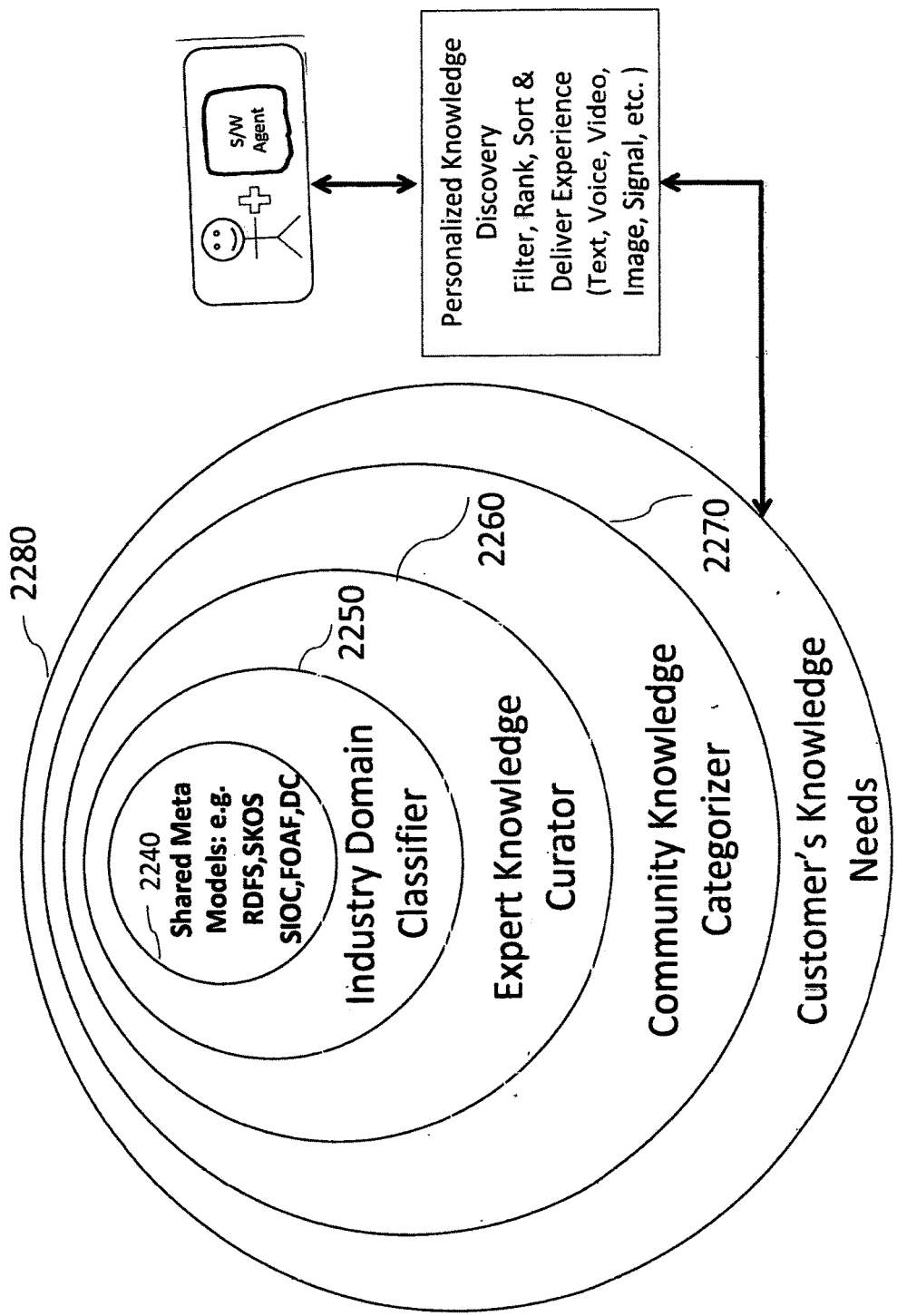
FIG. 6 Universally Linked Domains using Shared Model Classifications shows next level details of FIG. 5, as a reference, using core meta model examples like SIOC, SKOS, FOAF schemes and unified contextual graphs as a reference for the reader.

NOW LOOKING AT FIG. 6, we propose the use of adequately populated semantic knowledge graphs to persist the formalized definitions starting with core business entities of the applicable user (like customer's business model elements, products, features, market segments, business metrics, customer (2280) and ecosystem suppliers and channel partners) (2250) and community relationship types (2270).

The formalized definition models simplify coding (see FIG. 7, 2410) and scoring during content qualification which is key in automate knowledge transfer workflows, scale and accelerate learning between humans and computers (FIG. 8, 2460).

Figure 7:
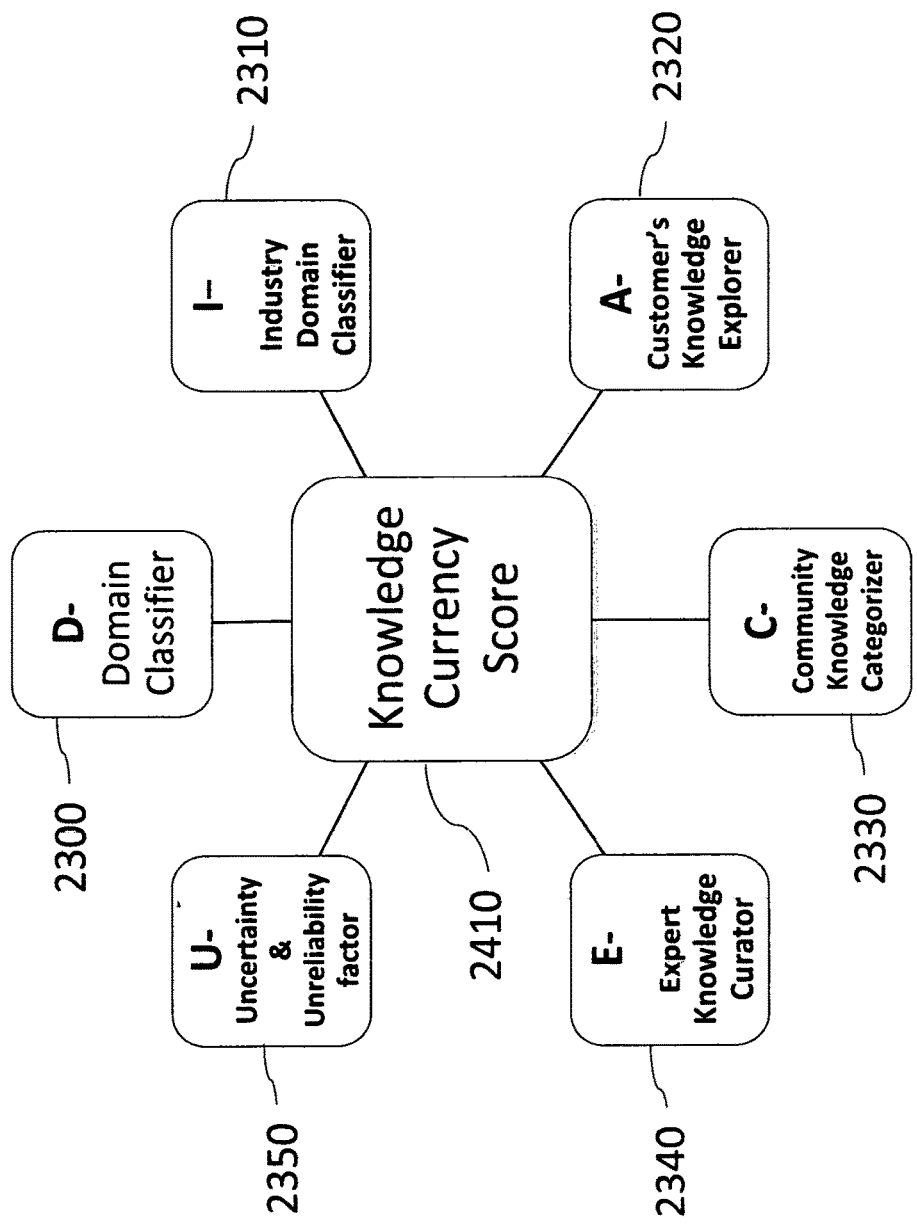
FIG. 7 Multi-Stage Multi-Dimensional Knowledge Currency Valuation shows parameters and factors assigned to various stages, depth and dimensions used in KCS valuation.

Digitized knowledge transfer service models are defined in terms of activities involving Actors (FIG. 5, 2200), Quests (FIG. 5, 2210) & Goals (FIG. 2230):

1- knowledge consumers quests vs knowledge providers broad goals (FIG. 7, 2320)

2- exponential efficiency by recursively incorporating prior results (FIG. 7, 2310)

3- augmenting validated knowledge sets by linking new knowledge models (FIG. 7, 2340)

4- deeper fine grain mutual understanding between human and computed digital agents, through computing constructive conversations and decision tree planning (FIG. 7, 2330).

KCS model can be implemented and used in digitized "knowledge refinement" process generating "reliable knowledge" (FIG. 7, 2300).

NOW LOOKING MORE CLOSELY AT FIG. 7, this model is further described in detail, the Multi-Factor Relevancy KCS (2410) is measured based on what community C (2330) and domain experts D (2340) and consumers value (2320), given their attention and experience rather than brand advertisers target marketing criteria.

NOW LOOKING AT FIG. 8, this embodiment presents a view of the iterative workflow algorithm of major tasks designed to produce quality target content using the novel multi-dimensional KCS scoring (2460). Each task uses various data analytics and advance AI mechanism, to compute KCS ("Knowledge Currency") using a minimum of 6 core dimensions representing core contexts & viewpoints as discussed previously. The objective is to identify trusted & high quality knowledge resources (Unified Linked Distributed Domain Smart Contracts & Knowledge Blocks) (1630) from one's general target domain of knowledge, topics of interests, community and personal viewpoints, by refining and constraining flow of expert knowledge, and filtering out irrelevant and noisy information through (2460):

NOW LOOKING AT FIG. 9, four layers of knowledge sourcing, KCS valuation and delivery to clients that are implemented and provisioned in a non-monolithic, scalable, trusted and distributed computing architecture. The result is an adaptive AI-enabled, explainable, traceable and trusted flow of current knowledge objects (knowledge nuggets) from distributed sources of knowledge to consumers of knowledge in personalized client advisory applications. The function of the four abstract layers needed for continuous machine & personalized learning include:

Hybrid Human—Enhanced personalized online search filters, (2500)

Interactive Community engagement tools (2520)

Expert & knowledge discovery tools (2540)

Trusted & Qualified Knowledge Base (2560),

NOW LOOKING AT FIG. 10, to model critical problems, and best resolution paths while detecting unfair bias, enhancing relevant decisions by automatically utilizing a smart reasoning engine, "Seeker", (2700), incorporates community members insightful perspectives (2680) and domain expertise, "ExpertBook" (2670), using advance scoring techniques to calibrate the trustworthiness and quality of supplied knowledge as needed in Conversational AI digital care, and mentor and advisory applications, "BestFriend" (2640).

What differentiates this KCS multi-stage and multi-dimensional model for classifying and refining knowledge blocks from uncertain elements is in its flexibility, dynamic adaptation and leveraging prior iteration of digitized knowledge in each future content upgrade cycles (1620).

As illustrated in FIG. 10, one embodiment builds an automated Customer Call Center with Digital Agents, offering Care advisory, Customer Engagement, and Conversational Services (2600).

In further detail, and explained in even greater detail to follow, BestFriend service enables access to a Customer knowledge base (digitized, machine readable, standardized & curated) enabling Search, Discovery, Question & Answers, Topic-Specific notification and Smart Advisory services (2640). ExpertBooks service enables customers access to Subject Matter Expert's tacit and Collaborative Knowledge Services (2670). Knowledge Refinery service enables access to customers application specific Knowledge Discovery Services (2680). KnowledgeBlox service enables access to Customer Domain and Industry specific Classified content (2690). The knowledge models are represented, implemented and deployed as formal ontologies and interlinked into semantic knowledge graphs populated with Customer's domain (FIG. 4, 1850), industry (FIG. 4, 1750) and application specific facts, (subject, objects and predicates) and business rules, extensible and actionable through reasoning functions.

As illustrated in FIG. 8, KCS model simplifies automatic quality assurance process and detection of unreliable content (2400) or the vulnerability in internet based crowed sourced or journalist sourced news channels that has resulted to what is commonly referred to as "fake news". The usability of KCS model has been intensely researched and demonstrated as part of a knowledge factory solution made of four layered integrated system architecture (2470).

The following four layered reference architecture provides the minimum and necessary environment for human and machine agents to work together, as participants in specific domain of knowledge work groups, collaborate in ongoing content processing, deep analysis, learning, classification and discovery of core concepts, resulting in distinctive KCS computation and enhanced search service experience:

1- BestFriend is a software (sometimes "S/W") component function as a personal digital agent, companion, advisory and assistant agency capable of digital exploration, communication, consumption, human conversations and serving valued knowledge objects (2650).

Figure 12:
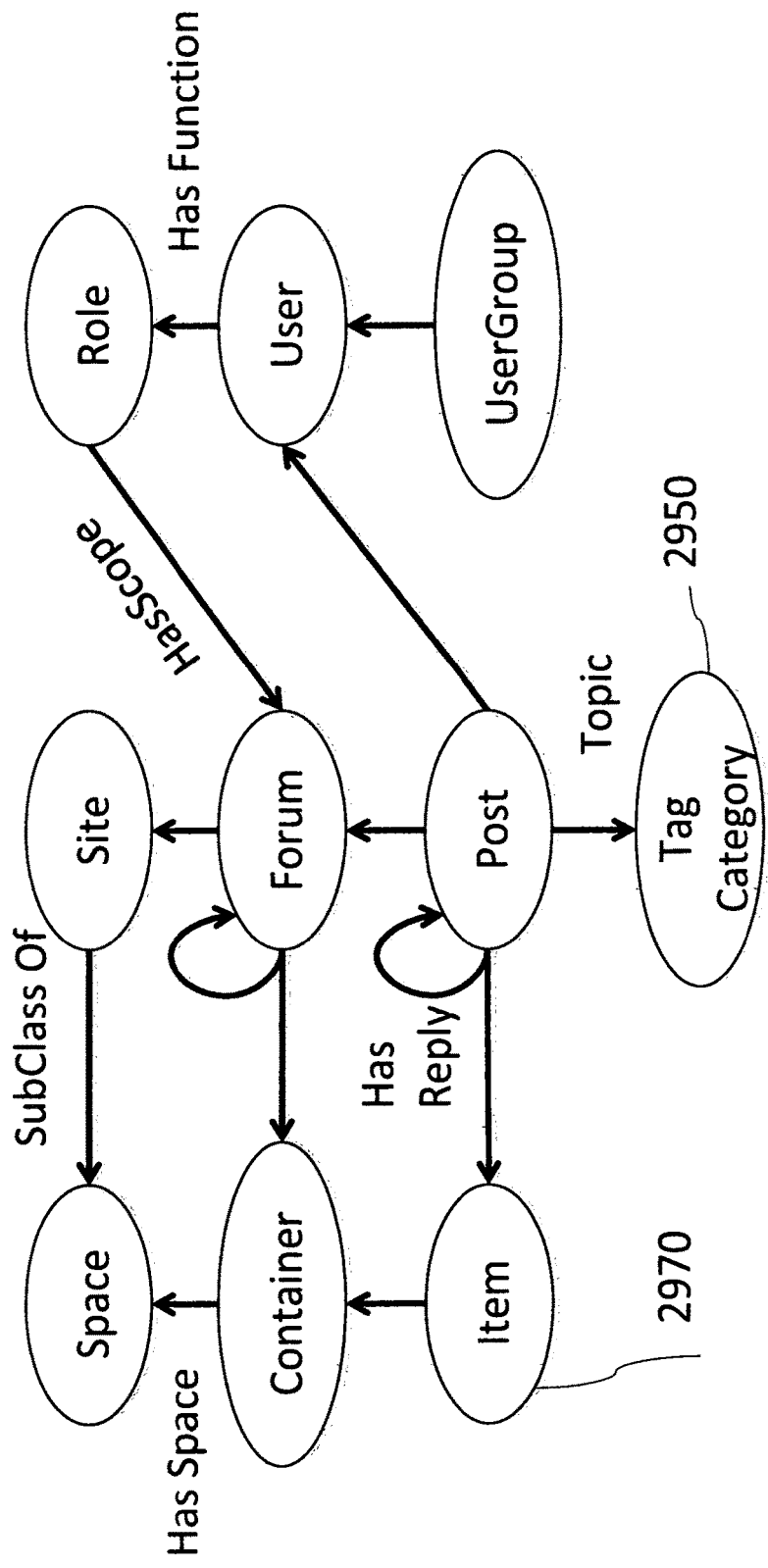
FIG. 12 Community. Expert & Customer Viewpoints as Tag Classifications shows an example of using SIOC ontology to capture viewpoints of members of communities of practice collaborating engaged in conversation, in terms of topics, forums, posts and replies.

2- Knowledge Refinery is a software based workflow of processing a specific set of document types containing critical content, that is secure, online tasks are streamlined, connected, dynamically assigned and promotes collaborative tracking, adaptive to variation of document and content types (2680). This system automates the redundant and high-volume aspects of knowledge processing services. It is used to consume a pipeline of raw content input that needs to be analyzed and consumed by human and machine (Digital Agents), summarized and refined according to the consumer demands. This process of refining raw data from multi media archives uses appropriate adaptors that can convert the format and meaning associated with entities in multi media information package. The challenge of developing appropriate adaptors for various formats, like OCR files convert to pdf convert to XML convert to relational database structures, has been overcome and achieved, as described herein. This result produces a unique fine grain data elements in bulk and war content files (multi media archives) into easily scored, indexed and profiled data records in the knowledge refinery database. The steps taken to automatically apply universal machine-readable format makes it much simpler to compute semantic meaning (an example of which is FIG. 20), domain of knowledge relevancy and rank scoring (an example of which is FIG. 8). Depending on the industry (for example legal domain (FIG. 10, 2610), or career training topic (FIG. 10, 2630), or industry domain like Pharmaceuticals or others (FIG. 10, 2620) additional set of desired knowledge structure standards (FIG. 6, 2250), and properties can be applied to further enrich the value associated to fine grain knowledge objects with a universally identifiable and exchangeable AI enabled data units (FIG. 12, 2970).

3- ExpertBook is a human expert guiding the understanding and decision path planning collaborating through an online environment that allows any time communication and adapts to dynamics of associations and content exchanges in a network of knowledgeable expert agents, offering service valuation model, expert validated service recommendations in a domain of knowledge, credibility framework and service consumer context (FIG. 10, 2680).

4- KnowledgeBlox is an artificial intelligence (sometimes referred to herein as AI) services to that generates the proprietary semantic meaning and valuation model called Knowledge Currency Score (KCS), that helps to compute the optimum pathways for exploring truth given a search request, from the perspective of consumer exploring the truth, available distributed and decentralized expert knowledge, and supply-demand currency valuation strategies (FIG. 10, 2690). The encrypted blockchain and semantic web technology infrastructure is used to represent packages of related valuable units of knowledge represented using standard representation of SKOS ontology (see FIG. 14).

The role of the Best Friend layer to emphasize the distinction of Digitized Client, consumer of knowledge as an end-point. It can be a user's personal Digital Assistant tasked to be by a Personal Expert System agent (FIG. 10, 2650). For example a student taking a course, using their digital learning agent to practice and work on homework, as a requester (user) activity, reaching into the previously classified and accessible Knowledge Refinery digital data library service, in order to further explore and discover in a specific domain of topics, requesting content highly relevant to an input (expressions, entities and phrases represented in the search criteria). Considering user request interaction data model, representing (user's) registered profile and preferences, is continuously updated with set of possible needs, intents through search requests activities, identify sub set of possible reliable information set needed to reach the reliable knowledge objects or services that satisfies the search criteria.

Figure 18:
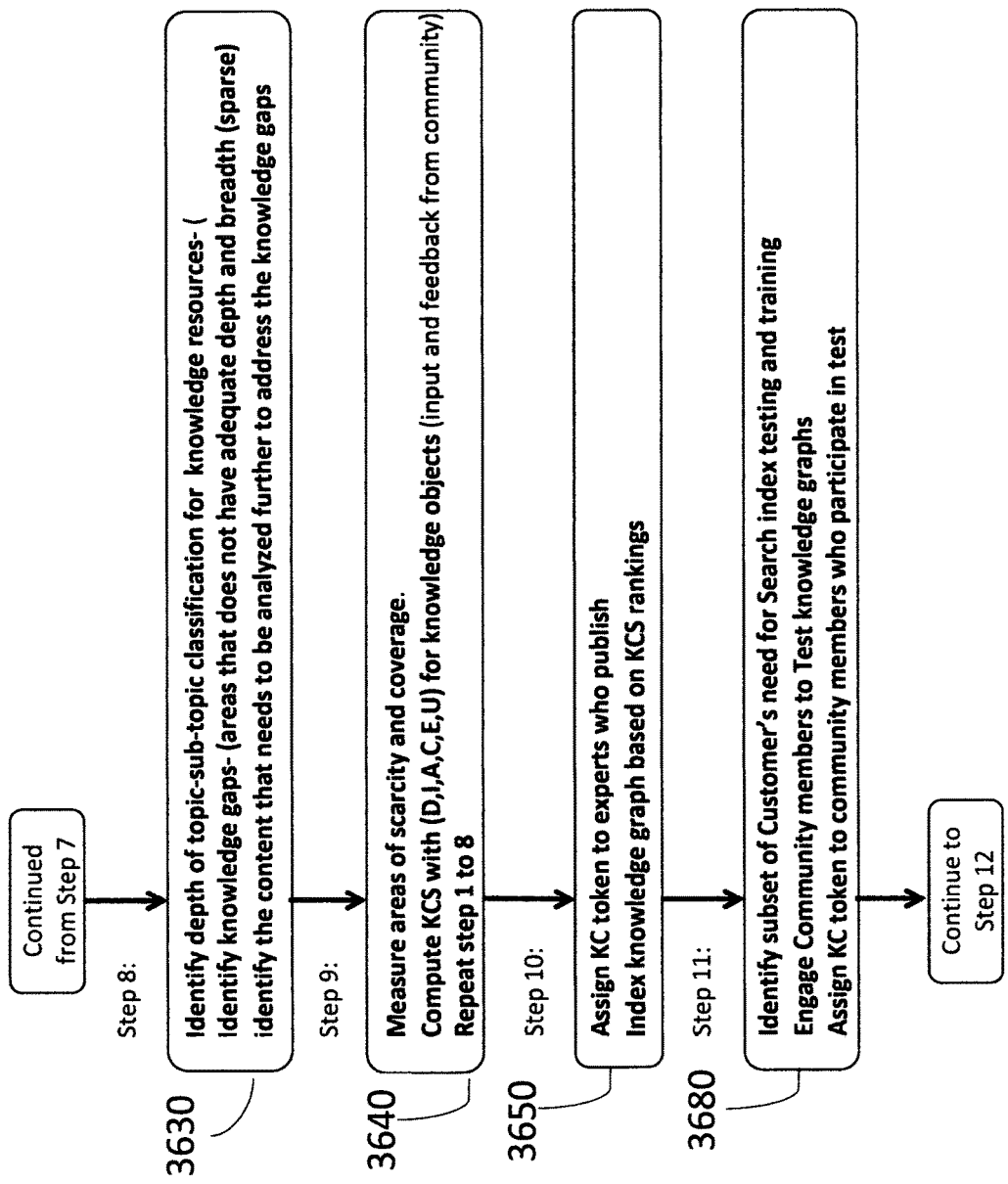
FIG. 18 Digital Knowledge Refinery and KCS Workflow Algorithm Steps 8-11 shows high level logical process and functional tasks at each steps of 8, 9, 10 and 11. Iteratively compute KCS for each knowledge resource. Index knowledge graph and test relevancy.

One of the challenges in digital transformation is the safe, continuous, selective and useful "transfer of knowledge & learning" to the digital agents (FIG. 10, 2640). The communication and transfer of knowledge and learning between the human actor and digital actors need to comply with user level of privacy, integrity and authorization be through a universally interpretable, auditable and machine-readable standards (FIG. 5, 2200). The method (Universal data model, auto classification algorithm and software design) dynamically updates and computes the relevancy of user's personal profile (various digital data & activity logs telemetry), available digital knowledge library, and related environmental data, to up personal expert system or BestFriend's knowledge base. Software tool provides the digital agent interfaces with human (user) and digitals actors. Digital actor services interface with distributed, decentralized and internet-based services to provide an easier, safer, self-guided autonomous method to answer questions related to a set of domain of knowledge (FIG. 18, 3680). This is needed to systematically provide, communicate core facts, decision and success criteria, knowledge objects, needed to articulate the quest, digitize the argumentation process to engage relevant actors, resources and agents needed during the exploration and retrieval of the missing critical information needed to ask accurate answer a question.

From systems architecture and underlining infrastructure perspective, a set of existing and proven computing technologies are used to enable the scalability of storage and search, distribute access to secure data and metadata representation and managing trusted collaborators agreements. The platform is implemented through a cloud-based integration business process management, distributed ledger database technology such as blockchains and semantic knowledge graph database capabilities as the underlining core IT services.

To ensure ease of fine grain data integration, interoperability, machine readability, and compliance with W3C's data standards are used to guide all core data labeling and metadata representations (FIG. 6, 2240). As an example, through the use of semantic standard models (FIG. 6, 2240), such as SIOC (FIG. 12) and FOAF (in a machine-readable format), the distributed and decentralized natures of communities of collaborative experts participating and connected to their related domain of knowledge will be recognized and rewarded for their knowledge curating and classification services (FIG. 18, 3650).

The above four functions (see FIG. 9) serve as a horizontal platform that can be applied to any domain of knowledge, to help people, organizations and businesses to transform their past, current or future valuable information in a set of digitally organized, secured, valuated and consumable knowledge currencies (see FIG. 5, 2230).

AGAIN LOOKING AT FIG. 6 IN CONJUNCTION TO FIG. 10, the following are a simplified visual specification of some of the core standardized semantic web ontology models used in Knowledge Refinery (FIG. 10, 2680) and ExpertBook (FIG. 10, 2670): SIOC, SKOS, FOAF that are used to represent core entities and knowledge topics extracted and related during knowledge refinery phase, content analysis and classification stages and are provided for reference for the reader and should be well known by those skilled in the art (FIG. 6, 2240).

FIG. 12 shows an example of SIOC (Simple Interconnected Online Communities) Ontology Model representing communities of practice collaborating engaged in conversations expressing their viewpoints via associated forums, posts and Topic Tag Categories.

Figure 13:
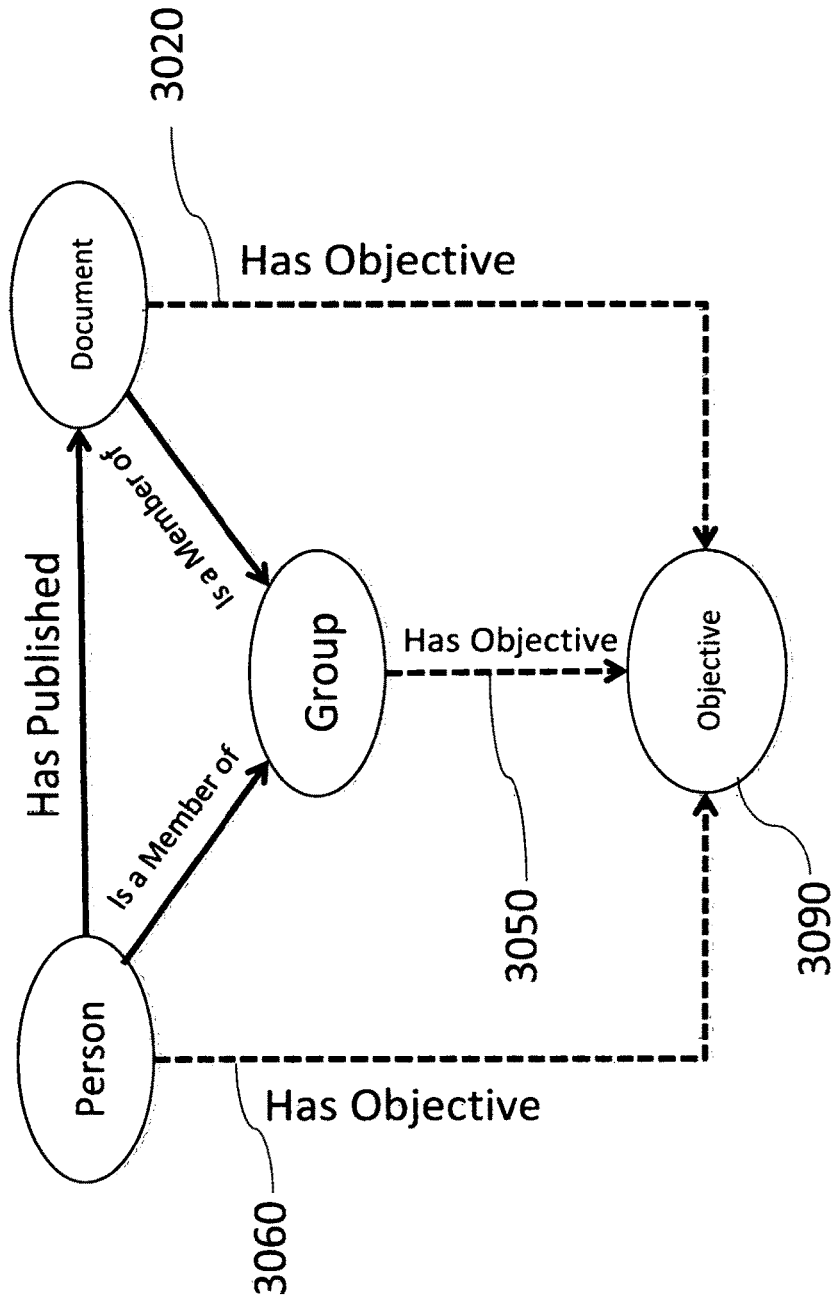
FIG. 13 Community & Expert Views in Adaptive Knowledge Classification shows an example of an ontology representing Objective relationships that can be discovered from facts collected from people and groups publishing documents in a knowledge graph, which can be used to do predictive analytics and recommend possible shared interesting objectives.

FIG. 13 illustrates an Ontology Model representing people connecting, facilitating collaboration and inferring additional possible relationships (3060, 3050, 3020) for a specific objective (3090), described in more detail below.

Figure 14:
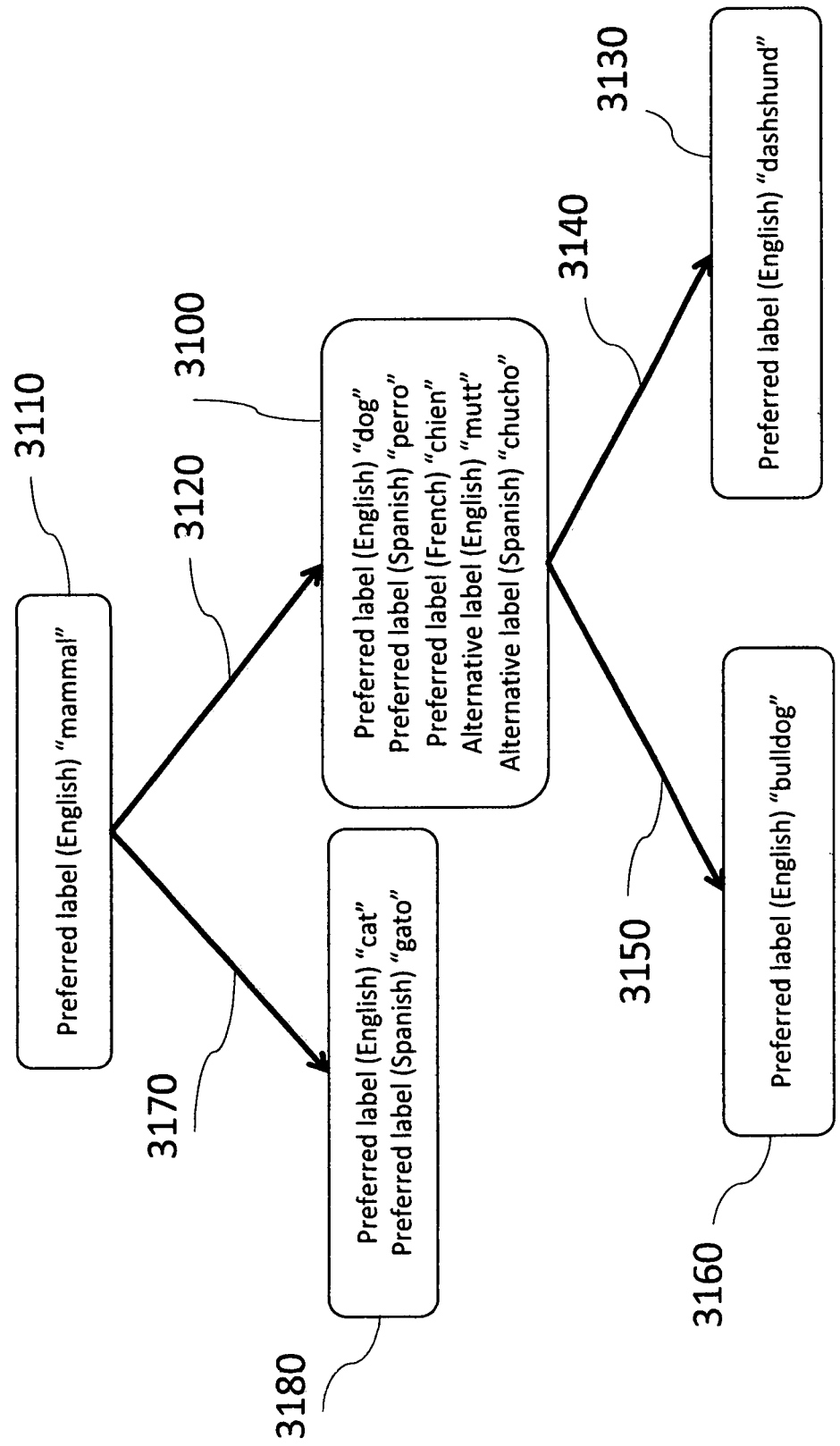
FIG. 14 Example of Linking Community & Expert views via SKOS Model shows an application of using SKOS meta-model ontology in incorporating diversity in languages when labeling the knowledge representation of certain animals ("Dog" or "Cat") in English Spanish or French etc.

FIG. 14 shows an example of SKOS Ontology model specifying related narrower topics in comparison to broader topics.

FIG. 15 shows an extract of concept scheme and the same as an SKOS RDF graph where knowledge nuggets can be discovered at broader or narrower level. (3200)

For example, in two real life scenarios:

Example 1

One or more people decide to prepare for a specific new career or job skills (FIG. 10, 2630). The current process of searching for most relevant pathways, options, is currently difficult and inefficient to use. Identifying best fit option, most relevant training and career service provider that can meet person's profile, goal and success criteria, due to the high volume and inconsistent classification of career training providers or priority given to providers purchased sponsored advertised ranking, raises uncertainty on the best fit and service recommendation option. The current on line search experience is very fractured, producing a high volume of links to sites with mostly information about the new career or job skills is too broad, high variances, sometimes not validated or available.

Example 2

In the context of legal domain of knowledge, comprised of legal systems, legal code sections of law, regulations, common practice workflow and decision making and search process, document types exchanged between parties, legal agencies, persons with a claim (FIG. 10, 2610), persons affected with a claim, examiners, jurisdiction, etc. An inventor would like to conduct more detailed research and development prior to submitting an application for a patent claim to a legal patent jurisdiction to be considered as a patentable invention. Upon required examination and investigation, and access to relevant explanation, body of evidence, arguments and reliable knowledge artifacts, related general or specific claims, a decision path for verifying the claim based on the reliability of information exchange, among all parties engaged is charted.

Figure 16:
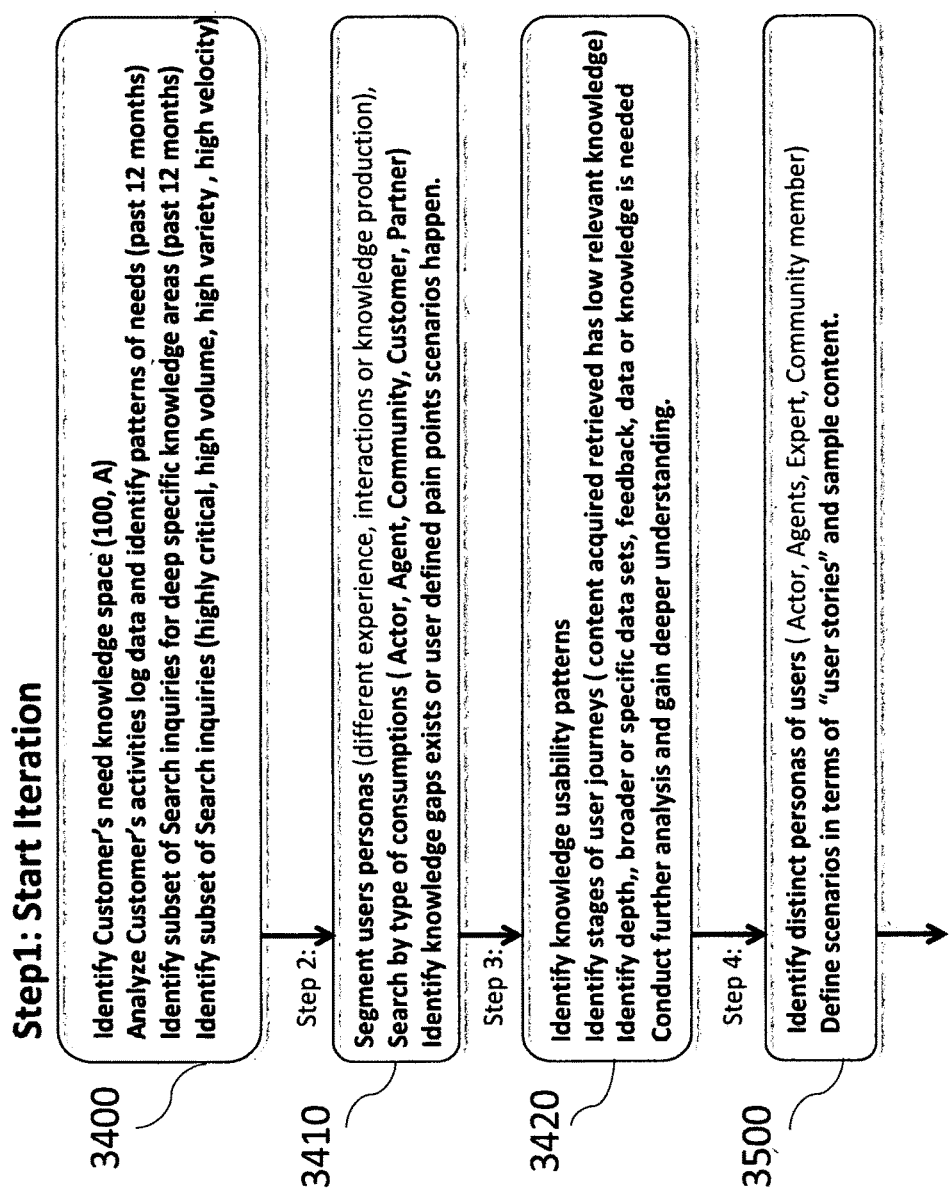
FIG. 16 Digital Knowledge Refinery and KCS Workflow Algorithm Steps 1-4 shows a logical iterative process identifying user's knowledge needs space expressed through search history activity data logs. Iteratively populate KCS knowledge graph. Through data analytics at each steps of 1, 2, 3 and 4 identify scope, topics and context of users need for specific knowledge resources.

NOW REFERRING TO FIG. 16, and in light of the above discussion, the process of understanding the consumer search quest starts (3400) with taking the user profile as the search input (3500). Depending on its complexity (number of keywords, sentence structure, referencing previously known or well known recognized named entities, etc.), the level of search complexity is determined.

A maximum of three steps dialog between human and BestFriend, (FIG. 10, 2650) search digital assistant software takes place, in order to gain a better computer model. The following three steps represent the relationship between BestFriend, ExpertBook, (FIG. 10, 2670) Knowledge Refinery services (FIG. 10, 2680).

The "BestFriend", represents the front-line consumer search and knowledge discovery experience tool, equipped with the computer human interface is used to communicate and transfer information back and forth between human and computing resources.

BestFriend is composed of five major layered distinct capabilities to produce best fit decision pathway that can results in the enhanced consumer centered search experience:

1- The front-end online computing interface ("content panel") (communication software application or hardware device)(FIG. 10, 2640) receives consumers request (natural language processing and user intent understanding, written, voice or brain signal thought enabled) topics, phrase, comment, quest (as the beginning of the search inquiry) as the input data from the designated subscribed user, the relevant environment, subscribed services and prepackaged digital library on a template (FIG. 10, 2640). At the front-end, via a three step argument building protocol, a structured dialog is formed between user and Digital assistant, tasked with finding the best recommended search results. The front-end content template and panel may request additional clarifying information to better classify user's search goal, context, quest, goals, intent and service requests. The user profile is continuously updated with user's context, prior search requests, decisions and actions taken after the ranked search results are returned.

2- The back-end online service of the Digital assistant further processes users request, profile, prior search and navigation and context, (computer software abstract a digitized data model of user request, in terms of specific software services and data resources needed) classifies the source, determines and reports the access rights and privacy scores, applies standardized and pre-defined data classifications, general domain topics category, and content media format (Data records, Text (recognized language), Image, Video, Audio and Code. Depending on the format, the proper library function or service calls are used to access, retrieval and minimal structuring process to produce universal knowledge representations (FIG. 13, 3090). This organizes "Raw Information" per user's desired domain of services, digital skills, knowledge and personal preferences. (See FIG. 17 listing high level steps of the Knowledge Refinery workflow and indexing knowledge graph based on KCS ranking.)

3- The subset of raw information sets, stored in digital media archives, databases or libraries, are identified using a graph of knowledge nodes and related pathways (knowledge graphs previously prepared for this particular domain of knowledge) and are virtualized and placed into the Digital Personal Expert System knowledge map using KCS model implemented in "Knowledge Refinery" process with occasional assistance from "ExpertBook" the network of registered experts and knowledgeable agents human or digital Expert services (FIG. 10, 2670).

Figure 17:
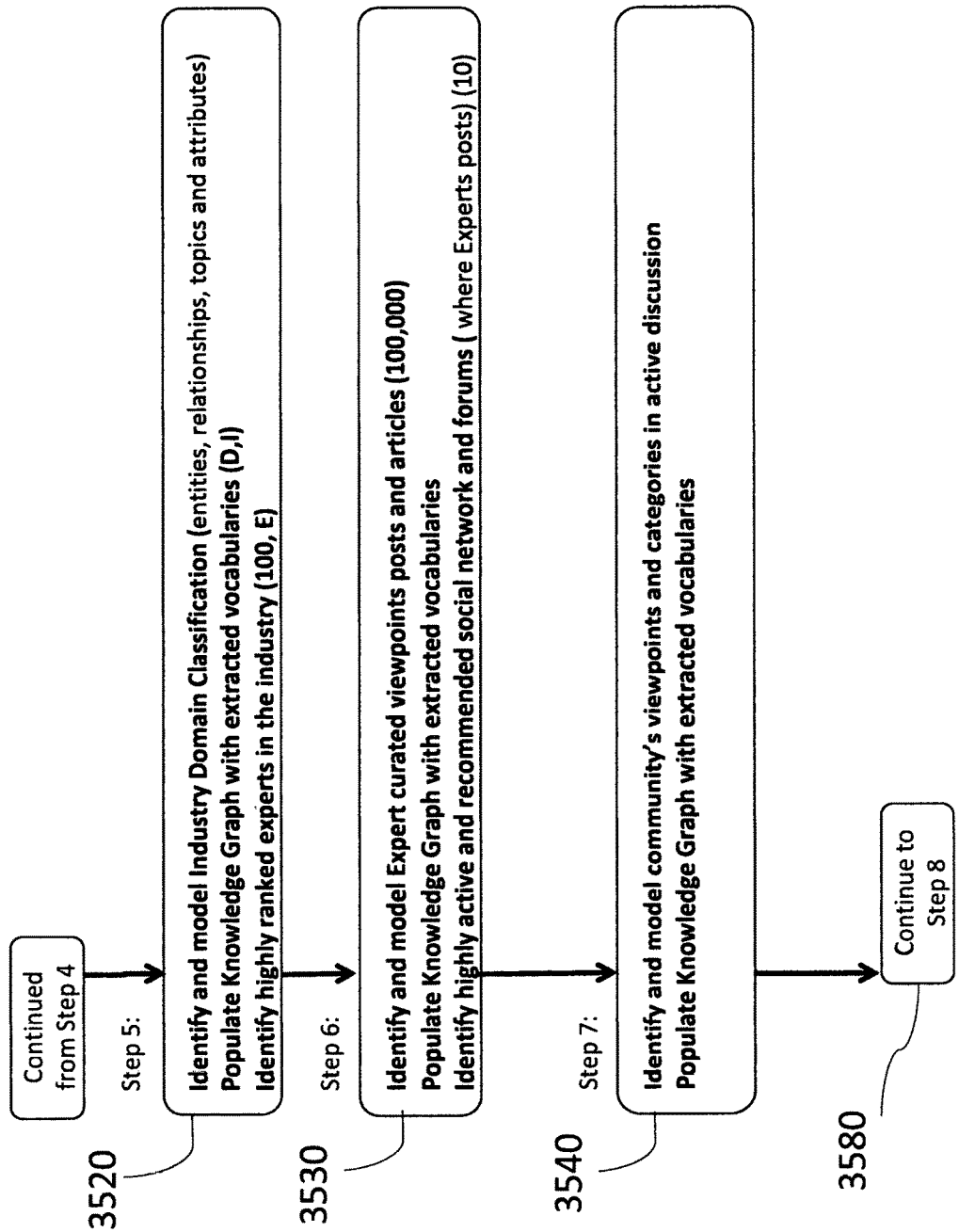
FIG. 17 Digital Knowledge Refinery and KCS Workflow Algorithm Steps 5-7 shows high level logical process and functional tasks at each steps of 5, 6 and 7. Iteratively populate KCS knowledge graph with models generated from industry experts, members of community of practice and Customers operating application.

4- "Knowledge Refinery" (FIG. 10, 2680) is an online automated pipelined workflow, collaborative, decentralized data processing service distributing work packages among human and digital actors are automatically deciphered and processed into digital packages of auto classified, annotated, meaningful machine-readable units with unique universal identifiers (see FIGS. 17 and 18)

5- The product is a set of universally identifiable knowledge objects (in case of Text or multimedia content—a combination of services are used like using Natural language processing, Image processing, Vision or Audio recognition tools) can be reviewed in the interaction panel. (See FIGS. 18, 19, 20).

NOW LOOKING AT FIGS. 16, 17, 18 and 19, which show a high level description of the steps in the KCS algorithm:

Example

Consider as a context, an on line Medical Knowledge library focused on sports related illnesses, that needs to be accessible at any time and any device for patients and staff (as Actor) as well as the Digital Patient Assistant application as the Digital agent).

Step 1:
Identify user's high volume, high variety, high velocity search requests queries, frequently occurring critical questions, high risk, high value knowledge needs or gaps scenarios (decisions). Identify personas in terms of different experience or knowledge production, search or consumptions (Expert, Community, Customer or Partner Actor, Digital Agent,) knowledge gaps exists or user defined pain points scenarios happen. (3400)

Step 2:
Identify scenarios and user journeys where problems occur and search for most relevant knowledge or actionable insights needs to happen. Identify where broader or deeper data sets, feedback, data or knowledge is needed to conduct further analysis and gain deeper understanding. Describe the sample set and scoped problems and decision challenges. (3410)

Step 3:
Identify personas of users (Customer user, Actor, Digital Agents, Expert, Community member, organizational functional leader) with sample set of critical queries and decisions each will need. Define scenarios in terms of "user stories" and sample content (3420).

Step 4:
Analyze sample medical content sets (related to sport medicine) and query samples (patient or staff questions) manually (50 content files and 100 questions and answers relevant to those files. A set of initial vocabularies, entities and relationships, topics and attributes will be generated (3500).

Step 5:
NOW CONTINUING TO FIG. 17, analyze using text parsers, using any open source tool that uses the initial vocabularies generated in step 4 with standard NLP tools like Stanford NLP tool kit (3530). Extract core entities and relationships as foundational vocabularies to be represented in terms of ontological models and taxonomies. Core domain knowledge concepts and link between them are the basics models forming the target domain of knowledge graph uploaded with instance data extracted from various sources knowledge. The result is knowledge graph that explicitly and dynamically attach Machine-readable meaning (ontologies) (3520).

Step 6:
Next, analyze another set of content from source of knowledge library (example, 100 files) using an automated text analytics or text engineering tool to parse the content (use most commonly used open source tool that uses the initial vocabularies generated in step 4, for example Stanford NLP tool kit) (3530). Next, extract a much deeper set of core entities and relationships among them as the next layer of foundational vocabularies and ontology and taxonomies that can be used in automatic tagging or source content classification. Next, core domain knowledge concepts and link between them are the basics models (formal knowledge represented using ontologies in RDF and OWL language), forming the first iteration of the use case—Sport Medicine domain of knowledge graph uploaded with related instance knowledge nuggets (comprehensible and concise topics and paragraphs) extracted from various sources knowledge. Next, use knowledge graph database platform (that are open source as recommended by W3C). The result is first version of medical knowledge graph that can be queried and deciphered to most relevant topic and categorized content, using with the sample 50-100 questions. Users (human Actors) or the digital agent (s/w) attach can also query the Machine-readable meaning (ontologies) (3530).

Step 7:
Following the workflow chart, the nest step in this embodiment is to conduct iterations of user validations, identify areas that knowledge graph does not have adequate depth and breadth (knowledge gaps). Based on recommendation from Domain experts and Community of practice identify the content that needs to be analyzed further to address the knowledge gaps. (3540) The next sept continues to FIG. 18.

Step 8:
NOW CONTINUING TO FIG. 18, the embodiment repeats steps 1 through 7 and measures areas of scarcity and coverage. Thereafter, the next step is to manually compute the KCS, given the input and feedback from members of Sport medicine community experts, forum questions and answers, and Sport medicine physician and clinic staff. Then use KCS to adjust the weights on relationships (3630).

Step 9:
Define search query wrappers that uses the calculated KCS to index those topics rank the content items most relevant to the user, context and questions (3640).

Step 10:
This method allows use of various NLP and ML tools to compute the strength of relationships. The differentiation is the in the multi-dimensional perspective (D,I,A,C,E,U) and feedback loop in continuously measuring the certainty, quality and query performance in enhancing the knowledge graphs organization of concepts, relationships and constraints (3650).

Step 11:

Iterate steps 1 to 10 with user validation and feedback until the level of accuracy and certainty from user experience is near 95% (3680).

Step 12:

NOW REFERRING TO FIG. 19. Step 12 is to enhance the Sport medicine knowledge graph with "data model constraints". For example, which sport activities will produce negative impact on certain sport illness or which treatment is not effective for certain illness. The "Positive" and "negative" constraints exist at all levels of "Community", "Expert", "Actors" and "Functional organization/clinic staff. A new updated and resulting knowledge is graphed of the relationships between the candidate queries, decisions, related topics, concept entities, questions and knowledge nuggets (3720).

Step 13:

Grow the knowledge base, by discovering new relationships and tag categories, Augment & enhance the knowledge graph with "data model constraints". Next, compute KCS rankings with (D,I,A,C,E,U) factors and varying uncertainty levels (1, 2, 3, 4) next, test new knowledge graphs relationships (the candidate queries, decisions, related topics, concept entities). Finally, test with Customer's critical exploratory questions & answers (level of accuracy and certainty greater than 95%) (3740).

Step 14:

Conclude this instance of continuous improvement and deployment of the knowledge refinery as a new released version of adapted, refined and enriched knowledge bases (3750).

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

I claim:

1. A computer-implemented method for acquiring, organizing, storing, ranking, and filtering knowledge about entities, the method comprising:

storing metadata including knowledge about entities in a knowledge metadata database, the knowledge metadata database comprising: sources of original content, sources of knowledge about entities and entity relationships, and knowledge about applicable user interactions with entities within the original content;

storing knowledge about the entities and relationships between the entities in a knowledge graph database, wherein the knowledge graph database comprises:

knowledge about entities in graph nodes, knowledge about applicable types of relationships between entities in the graph and graph relationship properties, including factual relationships, contextual relationships, and behavioral relationships;

storing extracted and identified industry specific classifier labels to entities smart content-records in a knowledge nugget content database, each of the knowledge nugget records having:

original content, knowledge about one or more entities associated with the original content including knowledge about applicable methods for interacting with the original content and with one or more entities associated with the original content;

storing further extracted and identified application specific classifier labels to existing entity smart content-records in a said knowledge nugget content database, each of the said knowledge nugget records further having:

additional knowledge about one or more entities associated with the knowledge nugget from applicable user continued interactions with entities in addition to said original content;

storing expert viewpoint categorizer labels to said existing entity smart content-records in a said knowledge nugget content database, each of the said knowledge nugget records further having:

additional knowledge about one or more opinions from other applicable users recognized for subject matter expertise of said content of the said knowledge nuggets;

storing assigned uncertainty and unreliability score numerical value label to said existing entity smart content-records in a said knowledge nugget content database, each of the said knowledge nugget records further having:

an assigned numerical value representing a measure of confidence in classification of the said knowledge nugget, said assigned numerical value comprising: consistency of said labels to said knowledge nuggets; and, a plurality of content display templates, including templates for:

a content panel displaying:

original content, said content panel having access to knowledge about entities associated with the original content; and an interaction panel displaying:

methods for interacting with said knowledge nuggets, said interaction panel having access to said labels about the interaction methods in said knowledge nuggets and to knowledge about the entities and graph nodes in the knowledge graph.

2. The method of claim 1, further comprising storing community audience attention to said existing entity smart content-records in a said knowledge nugget content database, each of the said knowledge nugget records further having:

additional knowledge about one or more opinions from other applicable users of said content of the said knowledge nuggets, said opinions comprising: usage, usefulness, annotation, comments, side notes or tags; and, said storing community audience attention entered manually by said user.

3. The method of claim 1, further comprising storing community audience attention to said existing entity smart content-records in a said knowledge nugget content database, each of the said knowledge nugget records further having:

additional knowledge about one or more opinions from other applicable users of said content of the said knowledge nuggets, said opinions comprising: usage, usefulness, annotation, comments, side notes or tags; and, said storing community audience attention fully automated.

4. The method of claim 1, further comprising receiving over a network access to the knowledge nuggets, the original content, the knowledge about entities and entity relationships, classifier labels, expert labels, community labels, and the user interface components.

5. The method of claim 1, further comprising applying adequately populated semantic knowledge graphs of said applicable user knowledge selected from the group consisting of: applicable user's business model elements, products, features, market segments, business metrics, applicable user's suppliers, applicable user's channel partners.

\* \* \* \* \*